US 8,660,100 B2

(12) United States Patent
Kim et al.

(10) Patent No.: US 8,660,100 B2
(45) Date of Patent: Feb. 25, 2014

(54) METHOD FOR TRANSMITTING INFORMATION IN WIRELESS LOCAL AREA NETWORK SYSTEM

(75) Inventors: Yong Ho Kim, Seoul (KR); Jin Lee, Seoul (KR); Ki Seon Ryu, Seoul (KR); Jeong Ki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 887 days.

(21) Appl. No.: 12/162,982

(22) PCT Filed: Feb. 1, 2007

(86) PCT No.: PCT/KR2007/000557
§ 371 (c)(1),
(2), (4) Date: Jul. 31, 2008

(87) PCT Pub. No.: WO2007/089111
PCT Pub. Date: Aug. 9, 2007

(65) Prior Publication Data
US 2009/0046682 A1    Feb. 19, 2009

(30) Foreign Application Priority Data

| Feb. 1, 2006 | (KR) | 10-2006-0009851 |
| Feb. 4, 2006 | (KR) | 10-2006-0010936 |
| Feb. 7, 2006 | (KR) | 10-2006-0011854 |
| Jun. 26, 2006 | (KR) | 10-2006-0057429 |
| Jul. 7, 2006 | (KR) | 10-2006-0063726 |

(51) Int. Cl.
*H04W 4/00* (2009.01)

(52) U.S. Cl.
USPC ............ 370/338; 370/328; 370/329; 370/341

(58) Field of Classification Search
USPC .................. 370/328, 329, 338, 341
See application file for complete search history.

(56) References Cited

U.S. PATENT DOCUMENTS 6,947,768 B2 *   9/2005   Adachi et al. ................. 455/560
7,492,744 B2 *   2/2009   Dooley et al. ................. 370/338
(Continued)

FOREIGN PATENT DOCUMENTS

JP    2005-184824    7/2005
JP    2005-295370    10/2005
(Continued)

OTHER PUBLICATIONS

El-Hoiydi, A.; , "Implementation options for the distribution system in the 802.11 wireless LAN infrastructure network," Communications, 2000. ICC 2000. 2000 IEEE International Conference on , vol. 1, no., pp. 164-169 vol. 1, 2000.*

(Continued)

*Primary Examiner* — Noel Beharry
*Assistant Examiner* — Kodzovi Acolatse
(74) *Attorney, Agent, or Firm* — Lee, Hong, Degerman, Kang & Waimey

(57) ABSTRACT

A method for transmitting information of a network interworking with a wireless LAN (802.11, Wi-Fi) network or EMID (ESS MAC ID) provided from an EMID server to a wireless user equipment if the wireless user equipment accesses the wireless LAN network is disclosed. A wireless communication system which performs communication using a plurality of subcarriers includes at least one access point receiving messages from at least one wireless user equipment and communicating with another access point through a distribution system, and at least one interworking information broker receiving information request message of subscriber service provider network (SSPN) through interface with the at least one access point and acquiring response information corresponding to the information request message through interface with a network entity which includes information of the SSPN, the information request message of the SSPN being transmitted from the wireless user equipment to the at least one access point.

6 Claims, 38 Drawing Sheets

(56) References Cited

U.S. PATENT DOCUMENTS

| 7,535,884 | B2* | 5/2009 | Stephenson et al. | 370/338 |
|---|---|---|---|---|
| 2004/0181692 | A1 | 9/2004 | Wild et al. | |
| 2004/0196817 | A1* | 10/2004 | Teague | 370/338 |
| 2006/0014536 | A1* | 1/2006 | Demirhan et al. | 455/434 |
| 2006/0019635 | A1 | 1/2006 | Ollila et al. | |
| 2006/0274743 | A1* | 12/2006 | Yegin et al. | 370/389 |
| 2007/0002806 | A1* | 1/2007 | Soomro | 370/338 |
| 2007/0230493 | A1* | 10/2007 | Dravida et al. | 370/412 |
| 2007/0243888 | A1* | 10/2007 | Faccin | 455/461 |

FOREIGN PATENT DOCUMENTS

| JP | 2005-348166 | 12/2005 |
|---|---|---|
| KR | 2002-0062595 | 7/2002 |
| KR | 2003-0085674 | 11/2003 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications," ANSI/IEEE Std 802.11, 1999 Edition (R2003), no., pp. i-513, 2003.*

B. Kim et al., "Dynamic Fragmentation Scheme for Rate-Adaptive Wireless LANs," 14th IEEE International Symposium on Personal, Indoor and Mobile Radio Communication Proceedings (PIMRC), vol. 3, pp. 2591-2595, Sep. 2003.

McDonald, et al., "Initial Network Selection Concept", IEEE 802.11-06/0072r1, Jan. 2006.

Korean Intellectual Property Office Application Serial No. 10-2006-0011854, Notice of Allowance dated Nov. 20, 2012, 2 pages.

Amre El-Hoiydi, "Implementation Options for the Distribution System in the 802.11 Wireless LAN Infrastructure Network", IEEE International Conference on Communications, vol. 1, pp. 164-169, 2000.

Kim, et al., "Dynamic Fragmentation Scheme for Rate-Adaptive Wireless LANs," The 141h IEEE 2003 International Symposium on Personal, Indoor and Mobile Radio Communication Proceedings, Sep. 2003, 5 pages.

El-Hoiydi, "Implementation Options for the Distribution System in the 802.11 Wireless LAN Infrastructure Network," 2000 IEEE International Conference, Jun. 2000, 6 pages.

Korean Intellectual Property Office Application Serial No. 10-2006-0063726, Notice of Allowance dated Apr. 29, 2013, 5 pages.

* cited by examiner

FIG. 11

| Element ID | Length | SSPN ID 1 | SSPN ID 2 | ... | SSPN ID N |
|---|---|---|---|---|---|

Octets: ←—1—→←—1—→←————— Length —————→

FIG. 12

| Element ID | Length | Result | Broker MAC Address | ... | Broker MAC Address |
|---|---|---|---|---|---|

Octets: ←—1—→←—1—→←—1—→←—6—→←Variable→←—6—→

FIG. 14

| Element ID | Length | EMID Service MAC Address |
|---|---|---|

Octets : ←— 1 —→←— 1 —→←——————————→

FIG. 15

| Element ID | Length | Request Info |
|---|---|---|

Octets : ←— 1 —→←— 1 —→←— 1 —→

FIG. 16

| Element ID | Length | Response IE | Response IE | ... | Response IE |
|---|---|---|---|---|---|

Octets: 1, 1, 1, 1, 1, 1

FIG. 17

| Category | Action | STA Address | Destination Address | Interworking Information Request IE |
|---|---|---|---|---|

Octets: 1, 1, 6, 6, 3

FIG. 23E

| Category | Action | Remaining Repetitions | Frag/Pack | AReq IE | Adv 1 Length | Advertisement 1 |
|---|---|---|---|---|---|---|
| 1 | 1 | 1 | 1 | N | 2 | N |

FIG. 23F

| Category | Action | Remaining Repetitions | Frag/Pack | Adv Length | Advertisement 1 |
|---|---|---|---|---|---|
| 1 | 1 | 1 | 1 | 2 | N |

FIG. 23G

| Category | Action | Remaining Repetitions | AReq IE | Adv Length | Ack | Advertisement |
|---|---|---|---|---|---|---|
| 1 | 1 | 1 | N | 2 | 1 | N | ns
METHOD FOR TRANSMITTING INFORMATION IN WIRELESS LOCAL AREA NETWORK SYSTEM

CROSS-REFERENCE TO RELATED APPLICATIONS

This application is the National Stage filing under 35 U.S.C. 371 of International Application No. PCT/KR2007/000557, filed on Feb. 1, 2007, which claims the benefit of earlier filing date and right of priority to Korean Application No. 10-2006-0063726, filed on Jul. 7, 2006, Korean Application No. 10-2006-0057429, filed on Jun. 26, 2006, Korean Application No. 10-2006-0011854, filed on Feb. 7, 2006, Korean Application No. 10-2006-0010936, filed on Feb. 4, 2006, and Korean Application No. 10-2006-0009851, filed on Feb. 1, 2006.

TECHNICAL FIELD

The present invention relates to a method for transmitting information in a wireless local area network (LAN) system, and more particularly, to a method for transmitting information of a network interworking with a wireless LAN (802.11, Wi-Fi) network or ESS MAC ID (EMID) provided from an EMID server to a wireless user equipment if the wireless user equipment accesses the wireless LAN network.

BACKGROUND ART

A frame structure used in a wireless LAN in accordance with the related art will be described below.

FIG. 1 illustrates a structure of a frame used in a wireless LAN (IEEE802.11, Wi-Fi).

As shown in FIG. 1, 802.11 medium access control (MAC) frame includes a header.

The MAC header includes a type field 12 and a more fragment field 10. The type field 12 identifies whether a frame body 11 of the MAC frame includes control information (for example, management frame) or data information.

The more fragment field 10 indicates whether a fragment additionally transmitted through the frame body 11 exists. In other words, specific data is divided into a plurality of fragments, and the more fragment field 10 may be set if a fragment to be received still exists.

FIG. 2 illustrates an example of a management frame used in a wireless LAN. The management frame includes various kinds of information in the frame body. Table shown in FIG. 2 indicates a beacon frame included in the frame body of the management frame, a probe request frame, and a probe response frame. The beacon frame, the probe request frame, and the probe response frame are examples of the management frame.

Various parameter sets are defined as shown.

FIG. 3 illustrates components of a management frame body used in a wireless LAN system. The components of the management frame body are comprised of a fixed area and an information element area. Fixed-length mandatory frame body components within the management frame are defined by the fixed area, and variable length mandatory frame body components and optional frame body components are defined by the information element area.

Hereinafter, a related art remote request broker (RRB) will be described.

The RRB which is one of elements of an access point (AP) of a wireless LAN exists in a system management entity (SME) of the AP. The RRB enables communication between APs which exist within a single mobility domain. In other words, communication through a distribution system (DS) is supported between the APs which own the same mobility domain ID by a logical connection structure through the DS. The RRB generates remote request/response frames between a current AP and a next candidate AP or relays messages between them.

Hereinafter, the operation of the related art device will be described.

1. General Configuration of a Wireless LAN (IEEE802.11)

The wireless LAN means a network environment that provides LAN services to a wireless user equipment provided with a wireless LAN card, such as PDA and notebook PC, by using an access point (AP) device corresponding to a hub of a wire LAN. In other words, the wireless LAN may be regarded as a system obtained by replacing a wire section between a hub and a user equipment in an existing Ethernet system with a wireless section between an AP and a network interface card (NIC) such as a wireless LAN card. Since the wireless LAN does not require wiring of a wireless user equipment, it has advantages in that it is easy to rearrange the wireless user equipment and to construct and extend networks, and enables communication during motion. On the other hand, the wireless LAN has disadvantages in that transmission speed is relatively lower than that of the wire LAN, signal quality is unstable in view of properties of a wireless channel, and signal interference may occur.

FIG. 4 illustrates a configuration of a wireless LAN network according to the related art. As shown in FIG. 4, the wireless LAN network is classified into two types depending on whether the network includes AP. The wireless LAN network, which includes the AP, is referred to as an infrastructure network while the wireless LAN network, which does not include the AP, is referred to as an ad-hoc network. A service area provided by one AP is referred to as a basic service area (BSA), and the AP and a wireless user equipment which is connected with the AP are referred to as a basic service set (BSS). A service provided to the wireless user equipment connected with the AP is referred to as a station service (SS). The SS includes a service exchanged between wireless user equipments in the ad-hoc network. As shown, the BSA which is a service area may be overlapped with another BSA. Two or more APs are interworked with one another, so that a wireless user equipment connected with a corresponding AP performs communication with a wireless user equipment connected with another AP. In this case, connection between the respective APs is referred to as a distribution system (DS). A service provided through the DS is referred to as a distribution system service (DSS). Also, an area that can be provided by the DSS is referred to as an extended service area (ESA). All the wireless user equipments and APs which receive the DSS within the ESA are referred to as an extended service set (ESS).

Services prescribed by the IEEE 802.11 standard provide nine lists as shown in Table 1 below.

TABLE 1 a) Authentication
b) Association
c) Deauthentication
d) Deassociation
e) Distribution
f) Integration
g) Privacy
h) Reassociation
i) MSDU delivery The authentication service and the deauthentication service relate to user authentication, and the association service, the deassociation service, and the reassociation service relate to access of a wireless user equipment to an AP. The reassociation service is used when the wireless user equipment shifts the BSS within the ESS or the current access status. The distribution service is a conceptional service that a wireless user equipment connected with one AP can perform communication with a wireless user equipment connected with another AP through the DS. The integration service is used for access between IEEE 802.11 LAN and an external LAN regardless of wire LAN or wireless LAN.

Each list of the services depends on setting of the DS. The privacy service relates to security and uses a wired equivalent privacy (WEP) protocol. The MSDU (MAC service data unit) service is used to transmit data of a user. Table 2 shows that the aforementioned service lists are collected and divided into two service categories described above.

TABLE 2

| SS (Station Service) | DSS (Distribution System Service) |
|---|---|
| a) Authentication<br>b) Deauthentication<br>c) Privacy<br>d) MSDU delivery | a) Association<br>b) Deassociation<br>c) Distribution<br>d) Integration<br>e) Reassociation |

The wireless LAN AP performs various functions such as a hub function of a wire LAN, bridge function, home gateway function, automatic fall-back function, and roaming function. The bridge function enables communication between two buildings, which are located far away from each other, using an oriented high gain external antenna. The home gateway function performs access of information communication devices at home to an external network using a wireless LAN AP. The automatic fall-back function serves to allow the AP to lower transmission speed from 11 Mbps to 5.5 Mbps, 2 Mbps, or 1 Mbps if the channel status becomes bad as the distance between the AP and the wireless user equipment becomes more distant. If transmission speed is maintained at 11 Mbps of high speed even in case that the channel status is not good, loss due to retransmission occurs seriously. Accordingly, it is desirable to appropriately lower the transmission speed. The basic roaming function can be performed between the BSSs.

2. Typical Example of Wireless LAN Network

FIG. 5 illustrates a communication environment where coverages of several APs are overlapped with one another. If hand-off is supported within a single ESS as the 802.11 technology is actively used, the environment shown in FIG. 5 could be the typical 802.11 network. In case of the network shown in FIG. 5, when a station (STA, WLAN UE) performs passive scanning to receive beacon packets, the STA receives the beacon packets from two or more APs which belong to a single AN. If the APs transmit the beacon packets to the STA, wherein the beacon packets include information of subscription service provider network (or AN) belonging to the AP, the STA can combine two or more packets with one another.

3. Wireless LAN and 3GPP Interworking

Interworking between wireless LAN and cellular network (3GPP) is divided into a scanning procedure for discovery of a wireless LAN network, an authentication procedure with the wireless LAN network, a cellular network discovery procedure, and an authentication procedure with a cellular network. A cellular network discovery and selection procedure is performed as a part of the authentication procedure with the cellular network.

3.1 Wireless LAN Network Scanning Procedure

The wireless LAN is provided with a name of a wireless LAN network as an SSID information element. A wireless LAN user equipment (WLAN UE) detects available wireless networks through the scanning procedure. The scanning procedure is classified into the following two types:

i) passive scanning which is a method of acquiring information by receiving beacons broadcasted from a network; and ii) active scanning which is a method of acquiring desired information of the wireless LAN user equipment by requesting a network to provide the desired information.

3.2 Authentication Procedure with Wireless LAN Network

This authentication procedure is performed through an authentication management frame. In case of an AP and a wireless user equipment, which support 802.11i, 802.1x based authentication is additionally performed after an association procedure is performed.

3.3 Cellular Network Discovery Procedure

The cellular network discovery procedure is performed between a wireless LAN user equipment (WLAN UE) and a local authentication, authorization and accounting (AAA) server to provide 'a supported public land mobile network (PLMN) list' to the wireless LAN user equipment, wherein the PLMN list is required to perform a passive selection procedure.

3.4 Cellular Network Authentication Procedure

Authentication with a cellular network is classified into an extensible authentication protocol-authentication and key agreement (EAP-AKA) mode and an extensible authentication protocol-subscriber identity module (EAP-SIM) mode depending on an extensible authentication protocol (EAP) which is supported.

FIG. 6 illustrates an example of a related art interworking procedure between a wireless LAN and 3GPP. In other words, FIG. 6 illustrates an example of an interworking procedure between a wireless LAN and a cellular communication network. The wireless LAN system can interwork with a cellular communication network (for example, 3GPP2) in addition to 3GPP. The wireless LAN user equipment performs passive scanning (S601) or active scanning (S602, S603) to discover a wireless LAN network. The wireless LAN user equipment selects a wireless LAN network depending on the result of scanning (S604). A distribution service should identify through which AP a specific user equipment can access in order to forward messages within a distribution system (DS), and this is performed as an association procedure (S605, S606). There may be various authentication methods in allowing a wireless LAN user equipment to perform authentication with a wireless LAN network. In this embodiment, examples of the authentication methods include an open system authentication method (S607, S608) and a shared key authentication method (S609 to S612). The wireless user equipment performs authentication procedures (S613 to S623) with 3GPP network to use the 3GPP network through the wireless LAN network. In this embodiment, a wireless user equipment and a communication network support EAP-SIM.

4. Method of Forwarding Interworking Information

Examples of a method of forwarding interworking information of a network, which is interworking with a wireless LAN network, in the wireless LAN network include a broadcast method of interworking information through a beacon and a probe response method of an AP to a probe request of a wireless user equipment.

4.1 Broadcast Method of Interworking Information Through Beacon

Hereinafter, a related art beacon which is divided into two types using a concept called a layered beacon will be described. In other words, the beacon is divided into a network maintenance beacon (NMB) which is conventionally used and a network discovery beacon which includes the interworking information.

Network Maintenance Beacon (NMB) indicates related art beacon message.

Network Discovery Beacon (NDB) indicates beacon message which additionally includes the interworking information in addition to the related art NMB.

4.2 Probe Response Method of an AP to a Probe Request of a Wireless User Equipment.

The wireless LAN user equipment (WLAN UE) requests the wireless LAN network to provide the interworking information through a probe request message if it does not receive the NDB. The wireless LAN network immediately forwards the interworking information to the wireless LAN user equipment through a probe response message if it has the interworking information. Also, the wireless LAN network acquires the interworking information from a network, which is interworking with the wireless LAN network, through a given procedure if it does not have the interworking information.

FIG. 7 illustrates a series of procedures of requesting and acquiring interworking information in a wireless LAN user equipment in accordance with the related art. The wireless LAN user equipment requests the AP to provide the interworking information IE1, IE2, . . . through the probe request message (S710). If the AP cannot provide the interworking information, the AP forwards the probe response message to the wireless LAN user equipment, wherein the probe response message includes information (ComeBackDelay) as to when to retransmit the interworking information and ID (Query ID) for identifying request of the interworking information (S720). The AP acquires the interworking information, which is requested from the user equipment, from the interworking network (S730, S740). The wireless LAN user equipment sends the probe request message at a scheduled comeback time, i.e., retransmission time (ComeBackDelay) of the interworking information. At this time, the wireless LAN user equipment requests the probe request along with the query ID received through the step S720 (S750). Accordingly, there is no need to indicate the interworking information again. The AP transmits the information acquired from the interworking network to the wireless LAN user equipment (S760).

FIG. 8 illustrates an example of a method for periodically transmitting NMB and NDB. The AP determines what time the NDB will be transmitted and transmits the NDB timely. Referring to FIG. 8, it is supposed that a transmission period of the NDB is 4, and the NDB is transmitted per fourth beacon.

FIG. 9 is a flow chart illustrating a method for performing communication between two APs through a DS. The two APs are connected with each other through a single DS. Referring to FIG. 9, each AP includes a MAC layer management entity (MLME) and an RRB. The wireless user equipment STA transmits an action frame to the current AP (S901). The current AP encapsulates the action frame in a remote request frame, sets a destination address of Ethernet frame as a target TAP address (AP address to which the action frame should be transmitted) referring to the target TAP address included in the action frame, and transmits the destination address (S902). The target TAP receives the remote request frame and decapsulates the action frame (FT action request) encapsulated in the remote request frame, and forwards the decapsulated action frame to a required place. The procedure of transmitting the decapsulated action frame to the required place is apparent to those skilled in the art and thus will not be described. The target TAP transmits a response message. In other words, to transmit the response message to the wireless user equipment STA through the DS, the target TAP encapsulates a desired action frame (FT action response) in a remote response frame and then transmits the encapsulated action frame to the current AP, i.e., the AP which has transmitted the remote request frame (S903). The current AP which has received the remote response frame decapsulates the encapsulated action frame to obtain the action frame and transmits the obtained action frame to the wireless user equipment STA through wireless communication.

The wireless user equipment STA can additionally transmit the action frame to the current AP (S905), and the procedure of additionally transmitting the action frame to the current AP corresponds to the above step S901. The current AP can encapsulate the action frame and transmit the encapsulated action frame to the target TAP (S906). Also, the current AP can decapsulate the encapsulated action frame by receiving the response message to the encapsulated action frame (S907). These procedures correspond to the steps S902 and S903. Also, the current AP can transmit the decapsulated action frame to the wireless user equipment STA (S908).

The aforementioned related art has several problems.

First, the related art has considered that the current AP acquires the interworking information and forwards the interworking information to the wireless user equipment STA. In other words, each AP has acquired the interworking information requested from the wireless user equipment STA through an arbitrary entity of a network having the interworking information and an arbitrary method that cannot be defined. In this case, a problem occurs in that processing throughput of data to be processed by the AP increases.

Second, although the wireless LAN user equipment requests the interworking information, if the AP does not have the interworking information, the AP reports ComeBackDelay to the wireless LAN user equipment and tries to acquire the interworking information. In this case, the wireless LAN user equipment should forward the request message to the AP again to receive the requested interworking information after the lapse of time as much as ComeBackDelay. For this reason, a problem occurs in that the wireless LAN user equipment and the AP should transmit and receive a large number of messages to and from each other.

Finally, the wireless LAN user equipment should receive the NDB to acquire the interworking information from the AP. In this case, a problem occurs in that the wireless LAN user equipment transmits the probe request message of the interworking information as it does not exactly know a transmission timing point of the NDB.

DISCLOSURE OF THE INVENTION

Accordingly, the present invention is directed to a method for transmitting information in a wireless local area network system, which substantially obviates one or more problems due to limitations and disadvantages of the related art.

An object of the present invention is to provide a method for efficiently processing various kinds of information while reducing throughput of data processed by an AP.

Another object of the present invention is to provide a method for efficiently acquiring interworking information using a small number of messages.

Other object of the present invention is to provide a communication method for allowing a wireless user equipment to exactly identify a transmission timing point of messages transmitted along with interworking information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wireless communication system which performs communication using a plurality of subcarriers includes at least one access point receiving messages from at least one wireless user equipment and communicating with another access point through a distribution system, and at least one interworking information broker receiving information request message of subscriber service provider network (SSPN) through interface with the at least one access point and acquiring response information corresponding to the information request message through interface with a network entity which includes information of the SSPN, the information request message of the SSPN being transmitted from the wireless user equipment to the at least one access point.

Preferably, the at least one access point transmits information type, which indicates capability of the at least one interworking information broker, or address information, which indicates medium access control (MAC) address of the at least one interworking information broker, to the wireless user equipment.

Preferably, the beacon message the information type and the MAC address.

Preferably, the information request message is an action frame transmitted from the wireless user equipment.

Preferably, the action frame is encapsulated in a second layer message by the at least one access point and transmitted to the at least one interworking information broker.

Preferably, the second layer message is Ethernet frame or wire LAN message.

In another aspect of the present invention, a method for processing information requested from a wireless user equipment in a wireless LAN network includes transmitting a first request message, which is requested from an access point to acquire information from a network entity, to the access point, receiving a first response message from the access point, the first response message including an address identifying a plurality of wireless user equipments to which a response to the first request message will be transmitted and query ID identifying the first request message, and at least one time receiving a second response message, which is transmitted to at least one user equipment identified through the address identifying the plurality of wireless user equipments and includes the information acquired from the network entity based on the first request message.

Preferably, the second response message is transmitted by the access point at a timing point indicated by transmission timing point information included in a beacon message of the access point.

Preferably, the transmission timing point information indicates the transmission timing point of the second response message using a reduced count value.

Preferably, the second response message is transmitted if the count value reaches zero (0).

Preferably, the count value is reduced per the beacon message which includes the transmission timing point information.

Preferably, the address identifying the plurality of wireless user equipments is a broadcast address or a multicast address.

Preferably, the method further includes transmitting a probe request message to the access point, and receiving a probe response message from the access point, the probe response message indicating whether the access point can access the network entity.

Preferably, the network entity includes an interworking information broker.

In other aspect of the present invention, a MAC frame used in a wireless LAN network includes a type field included in a header of the MAC frame, indicating whether control information is included in a frame body of the MAC frame, and the frame body including the control information, wherein if the control information is included in the frame body and a first part of the control information is any one of total fragments, the frame body includes fragment ID identifying the first part and a last fragment field identifying whether the first part is the last fragment.

Preferably, the fragment ID increases as the number of the divided fragments increases.

Preferably, the control information is an action frame.

Preferably, the header of the MAC frame includes a more fragment field which includes whether more fragments additionally transmitted through the frame body exist if user data information is included in the frame body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 11 illustrates an example of interworking information broker request IE;

FIG. 12 illustrates an example of interworking information broker IE;

FIG. 14 illustrates an example of EMID server IE;

FIG. 15 illustrates an example of interworking information request IE;

FIG. 16 illustrates an example of interworking information response IE;

FIG. 17 illustrates an example of interworking information request action frame;

FIGS. 23E and 23F are examples of formats of action frames used when Frag/Pack is an intermediate fragment or a last fragment in fragmentation;

FIG. 23G illustrates another example of a query response action frame;

BEST MODE FOR CARRYING OUT THE INVENTION

Figure 1:
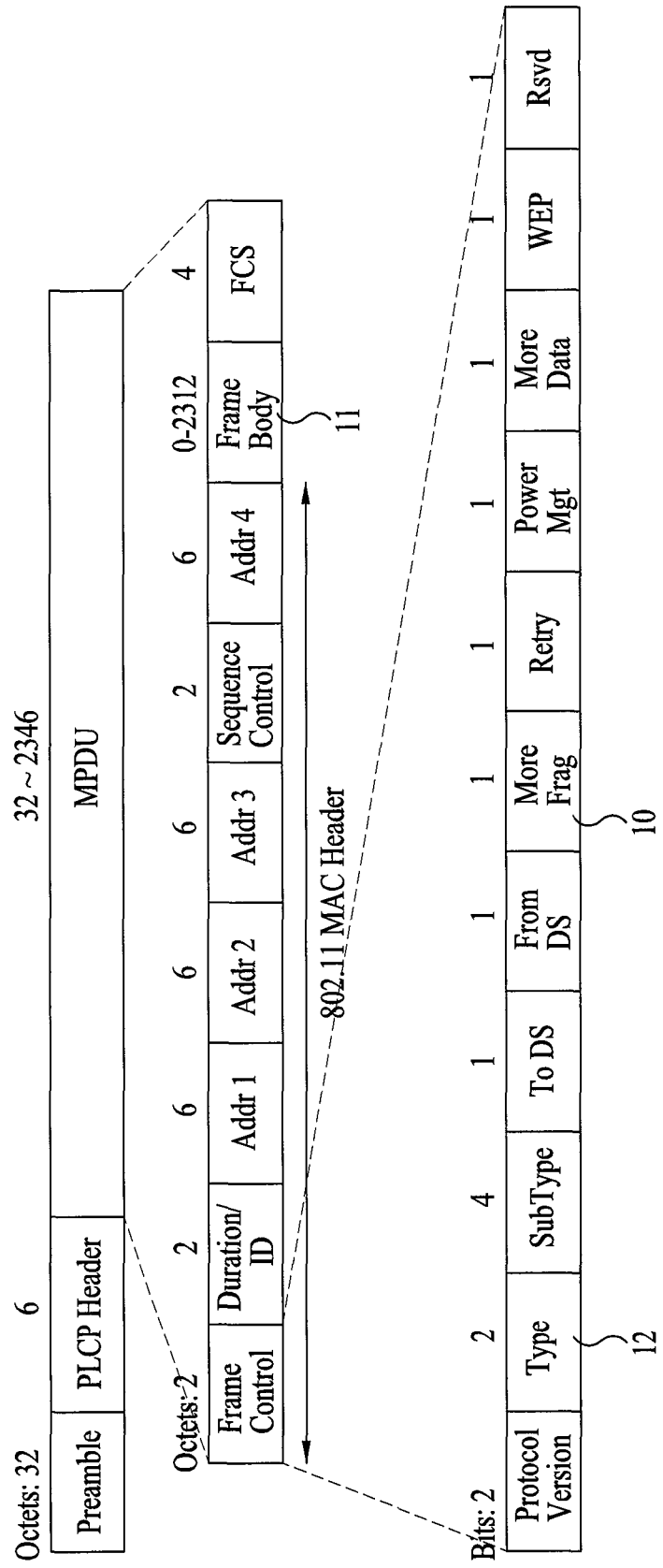
FIG. 1 illustrates a structure of a frame used in a wireless LAN (IEEE 802.11, Wi-Fi)
Figure 2:
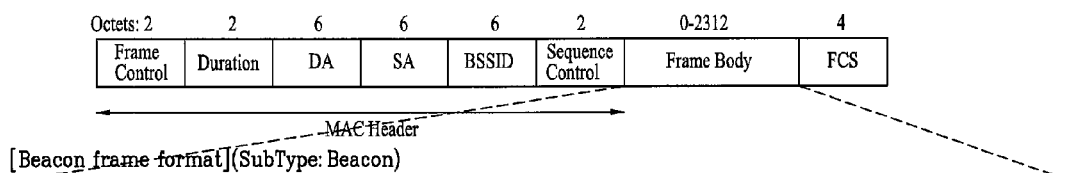
FIG. 2 illustrates an example of a management frame used in a wireless LAN.
Figure 3:
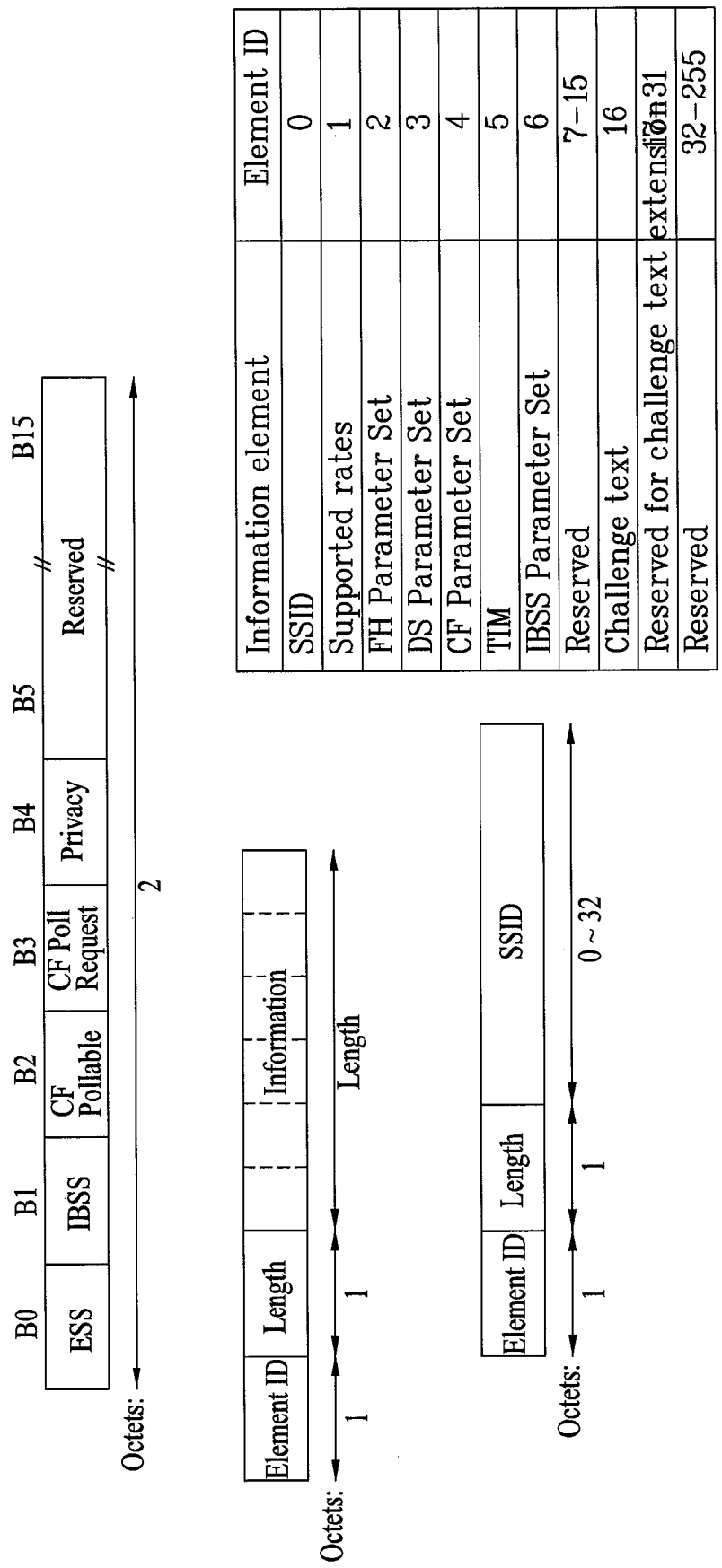
FIG. 3 illustrates components of a management frame body used in a wireless LAN system.
Figure 4:
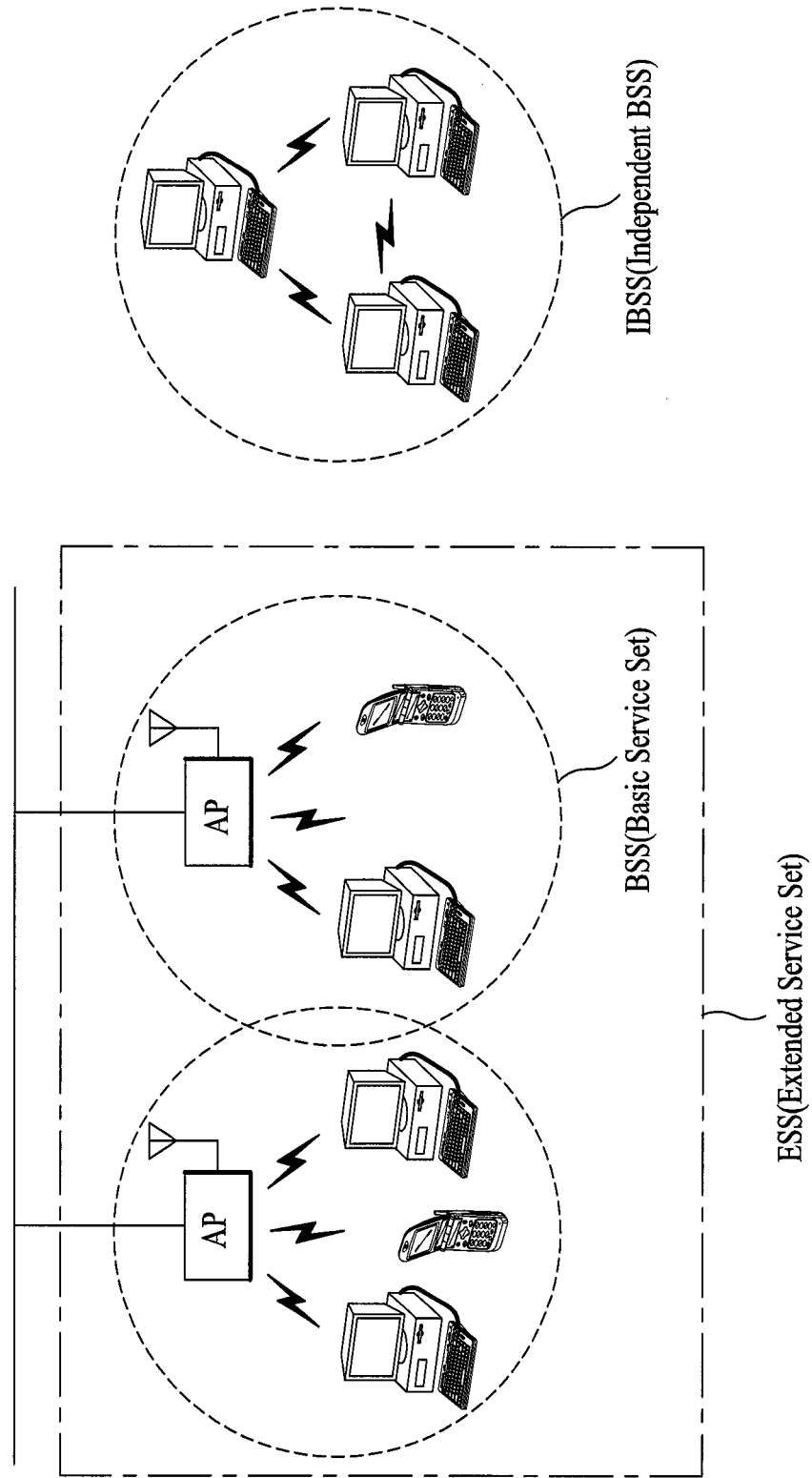
FIG. 4 illustrates a configuration of a related art wireless LAN network.
Figure 5:
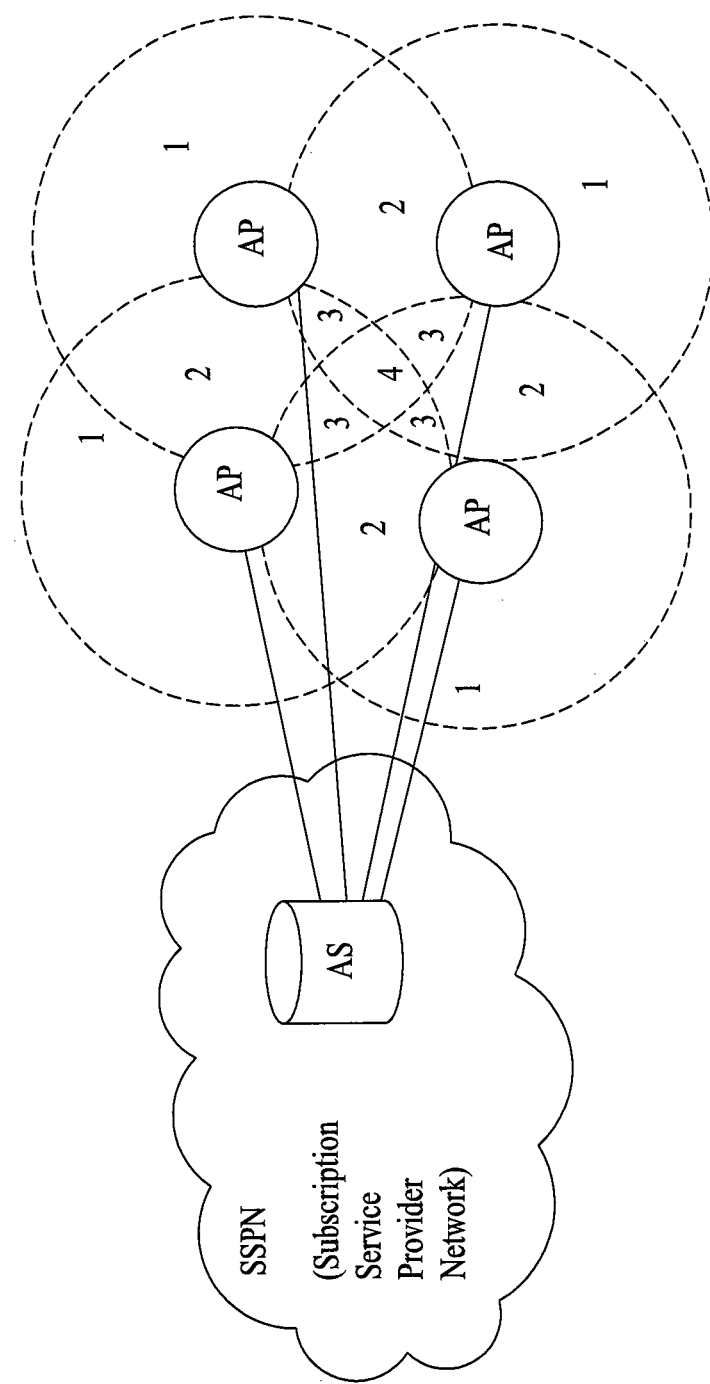
FIG. 5 illustrates a communication environment where coverages of several APs are overlapped with one another.
Figure 6:
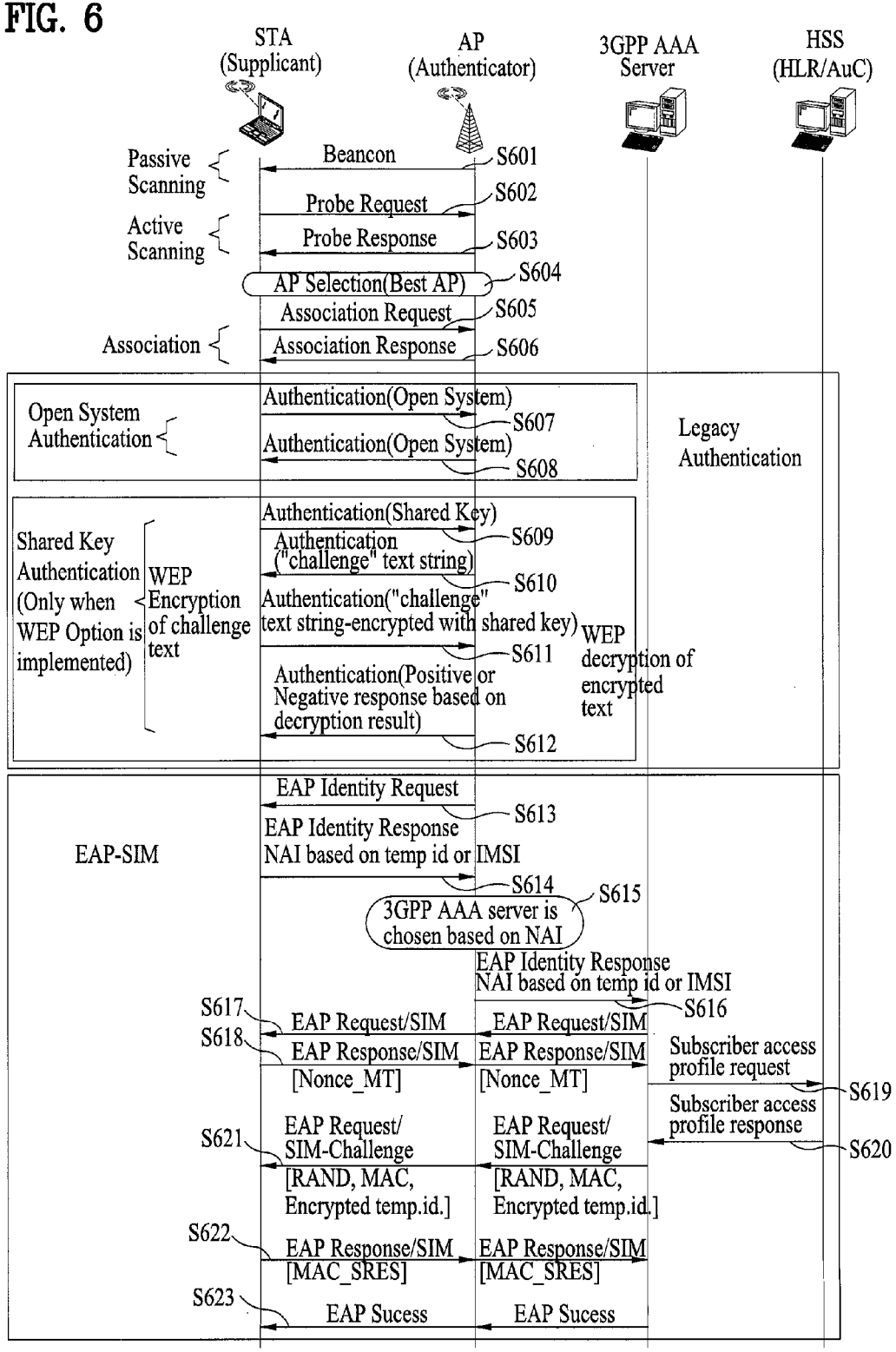
FIG. 6 illustrates an example of an interworking procedure between a wireless LAN and 3GPP in accordance with the related art.

The present invention relates to interworking information between a wireless LAN network and another network (Internet service, voice over IP service, IMS service, and the like) if a wireless LAN user equipment accesses a wireless LAN (802.11, Wi-Fi) network.

The interworking information indicates various kinds of data information provided from an interworking network (network for service such as Internet service). For example, roaming information, billing information, and service information could be the interworking information. This interworking information can be forwarded to the wireless LAN user equipment.

The wireless LAN user equipment performs communication with the wireless LAN network, and can receive service from an external network through the wireless LAN network. In other words, to receive service from the external network, the wireless LAN user equipment can request interworking information between the external network and the wireless LAN network (or interworking information between the wireless LAN user equipment and the external network) through the wireless LAN network before accessing the wireless LAN network.

In the case that the interworking information does not exist in the wireless LAN network, the wireless LAN network can acquire the interworking information from the external network to provide the interworking information to the wireless LAN user equipment.

In the case that a network, which is interworking with the wireless LAN network, exists, the wireless LAN user equipment, which is connected to the wireless LAN network, requests the wireless LAN network to transmit specific data. To acquire the specific data, the wireless LAN network can request the external network to transmit the data.

If the wireless LAN network acquires the data, i.e., the interworking information, it provides the interworking information to the wireless LAN user equipment.

There is no limitation in types of the interworking information. Accordingly, the wireless LAN network can transmit data of various kinds of services requested from the wireless LAN user equipment.

Furthermore, there is no limitation in types of the network which is interworking with the wireless LAN network. Accordingly, the wireless LAN network can receive data, i.e., interworking information from a related art synchronous and asynchronous cellular communication network or a network which provides other service so as to forward the data to the wireless LAN user equipment.

Hereinafter, detailed operation, features and effects of the present invention will be described in more detail in accordance with the preferred embodiment of the present invention.

The first embodiment, which will be described below, relates to a method for efficiently processing interworking information while reducing data processed by an access point.

FIRST EMBODIMENT

Hereinafter, a structure of a wireless LAN network and its message according to the first embodiment of the present invention will be described.

1-1. Structure of a Wireless LAN Network for Managing Interworking Information

Figure 10:
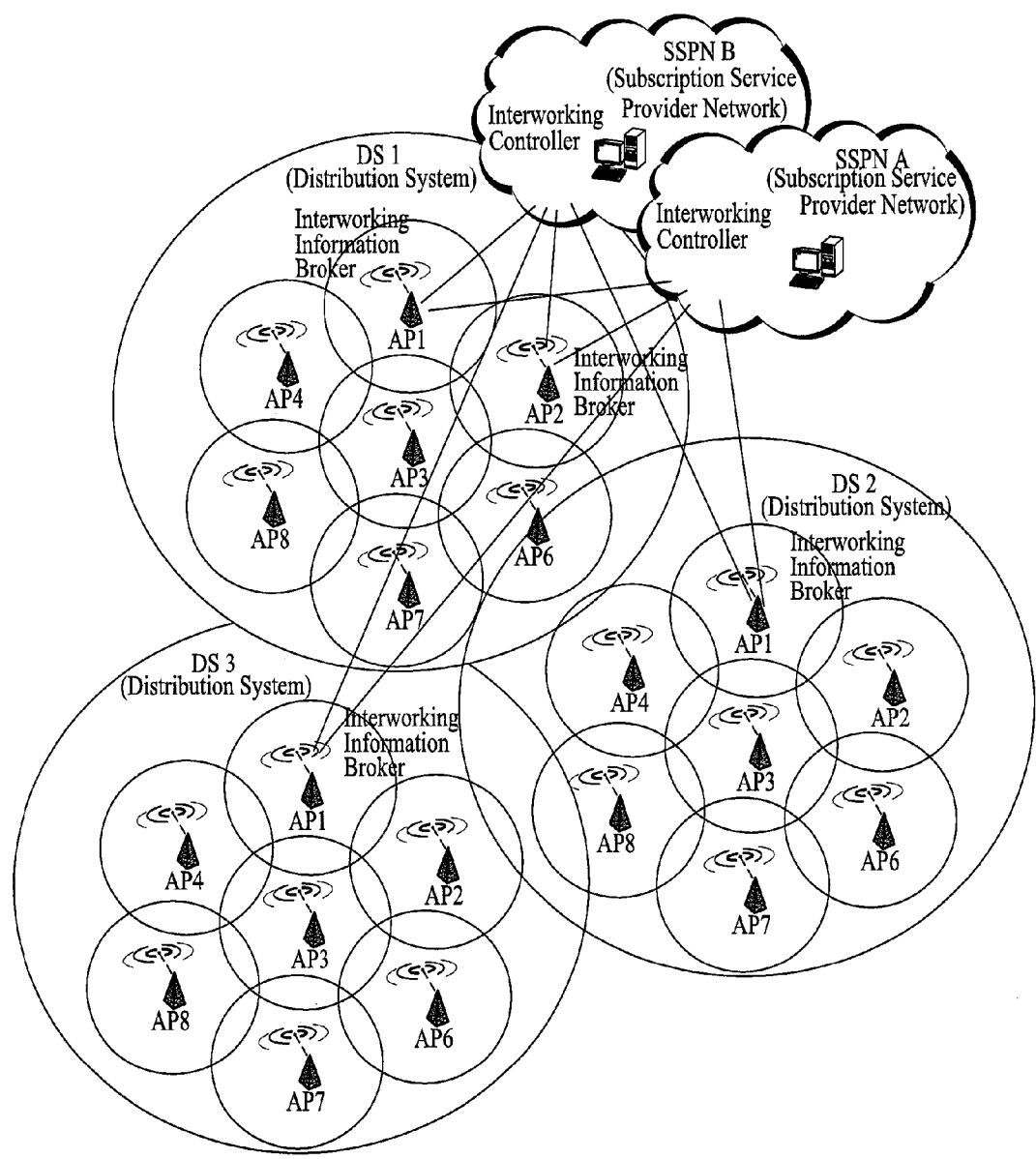
FIG. 10 illustrates a structure of a wireless LAN network for effectively managing interworking information.

FIG. 10 illustrates an example of a structure of a wireless LAN network for efficiently managing interworking information. Referring to FIG. 10, at least one interworking information broker exists within each distribution system (DS).

As shown in FIG. 10, the interworking information broker serves to acquire interworking information (for example, roaming probability information, billing information, and supported service such as voice over IP, IMS, and push to talk) with other subscription service provide network (SSPN). In other words, the interworking information broker is an entity which acquires various kinds of information, i.e., interworking information from a specific SSPN.

Although the entity which acquires the interworking information is referred to as the interworking information broker, the entity is not limited to such a term, i.e., the interworking information broker in the present invention.

Furthermore, the interworking information broker may be realized by an independent device or may be realized as a function included in other network entity. In other words, a function of acquiring the interworking information may be added to a specific AP to allow the AP to perform a function of the interworking information broker. Alternatively, a separate server may serve as the interworking information broker. To receive a manner suggested in the present invention, the interworking information broker should support a structure and a function to enable communication on a DS.

The interworking information broker may be realized by a network entity which performs authentication, authorization and accounting.

An interworking information controller located in a specific SSPN includes all entities for interworking in the specific SSPN. In other words, the interworking information broker performs communication with the interworking information controller to acquire interworking information from the specific SSPN. The interworking information controller may be realized by various methods within the specific SSPN. As shown, one DS includes one or more interworking information brokers.

An ESS MAC identifier (EMID) server is an entity which allocates EMID to the wireless LAN user equipment. When the EMID server is located within the DS, the interworking information broker of FIG. 10 may be replaced with the EMID server.

Although the entity which allocates EMID to the wireless LAN user equipment is referred to as the EMID server, it is not limited to such a term, the EMID server in the present invention. Also, the EMID server may be realized by an independent device or may be realized as a function included in other network entity.

In other words, an EMID distribution function may be added to a specific AP to allow the AP to perform a function of the EMID server. Alternatively, a separate server may serve as the EMID server. Also, the EMID server and the interworking information broker may be realized by the same entity. To receive a manner suggested in the present invention, the EMID server should support a structure and a function to enable communication on a DS.

1-2. Examples of Wireless LAN (IEEE 802.11) Management Frames Suggested in this Embodiment Hereinafter, examples of wireless LAN (IEEE 802.11) management frames suggested to acquire the interworking information or EMID in accordance with this embodiment of the present invention will be described.

1-2.1 Probe Request Message

Table 3 indicates information element included in a probe request message used in this embodiment of the present invention. The probe request message is additionally provided with interworking information broker request IE to allow the wireless LAN user equipment to acquire information of the interworking information broker.

TABLE 3

| Order | Information | Notes |
|---|---|---|
| 1 | SSID | |
| 2 | Supported rates | |
| 3 | Interworking Information Broker Request Information Element | Interworking Information Broker Request IE(Information Element) is transmitted when information of interworking information broker which exists within DS is requested. The IE includes SSPN ID of a network which a wireless LAN user equipment desires, so that information of a specific interworking information broker, which can acquire information of corresponding SSPN requested from the wireless LAN user equipment, among interworking information brokers with which a specific AP is interworking, is reported through a probe response message which will be suggested below. |

1-2.2 Probe Response Message

Table 4 indicates information element included in a probe response message used in this embodiment of the present invention.

When information request of an interworking information broker entity is received from a specific wireless LAN user equipment, a current AP reports information of the interworking information broker entity, which can perform communication with the current AP through the DS, through the probe response message. In other words, the current AP, which performs communication with the wireless LAN user equipment, provides information of the interworking information broker located within the DS where the current AP is located, to the wireless LAN user equipment through the probe response message.

TABLE 4

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |
| 10 | Interworking information broker IE | includes information of interworking information broker with which current AP can communicate through DS (DS which includes current AP). |

1-2.3 Beacon Message

Table 5 indicates a beacon message used in this embodiment of the present invention.

Information of the interworking information broker can be broadcasted periodically through the beacon message. In the case that another interworking entity corresponding to the interworking information broker exists as described above, it is more preferable that information of the interworking entity is broadcasted periodically through the beacon message. If the information of the interworking information broker is broadcasted through the beacon message, a wireless LAN user equipment located within a coverage of a specific AP can acquire information of the interworking information broker before accessing a network. As the aforementioned beacon message is used, the wireless LAN user equipment according to this embodiment of the present invention is advantageous in that there is no need to transmit the information request message of the interworking information broker to acquire the information of the interworking information broker.

Information of the EMID server can be broadcasted along with the information of the interworking information broker through the beacon message. The EMID (ESS MAC Identifier) is an identifier given to the wireless LAN user equipment and is given by the EMID server. The EMID is an identifier corresponding to a related art MAC address. The MAC address is a physical address of Ethernet and generally has a length of 48 bits. The MAC address has been used to allow a header of a data frame of an MAC layer to designate a transmitting station and an address. Since the MAC address is given to a specific device, a problem occurs in that a moving path of a specific wireless LAN user equipment may be exposed through the MAC address. In this respect, EMID corresponding to the MAC address has been suggested. Since the EMID is variably provided from the EMID server, the wireless LAN user equipment can be provided with an identifier of a secured MAC layer as compared with the MAC address.

TABLE 5

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |
| 10 | TIM | |
| 11 | Interworking Information Broker | includes information of interworking information broker with which current AP can communicate through DS. |
| 12 | EMID Server Information Element | includes information of EMID server with which current AP can communicate through DS. |

1-3. Interworking Information Action Frame

Category values, MIH information elements, an action field, and a status code field for interworking information action frame newly prescribed for interworking information request/response are as follows.

TABLE 6

Category values

| Name | Value | See-sub field |
|---|---|---|
| Fast BSS Transition | 6 | 7.4.6 |
| Interworking Information | 7 | |
| Reserved | 8-127 | |

TABLE 7

Interworking Information action field values

| Action field value | Description |
|---|---|
| 0 | Reserved |
| 1 | Interworking Information Request |
| 2 | Interworking Information Response |
| 3-255 | Reserved |

TABLE 8

Status code field

| Status code | Meaning |
|---|---|
| 0 | successful |
| 1 | Unspecified Failure |
| ... | ... |
| 54 | Invalid PMKID |
| 55 | Invalid EAPKIE |
| 56 | Invalid Interworking Information Action Frame |
| 57 | |
| 57-65535 | Reserved |

1.4 Example of the Aforementioned Information Elements

FIG. 11 illustrates the interworking information broker request IE. The wireless LAN user equipment transmits the interworking information broker request IE along with SSPN IDs, wherein the SSPN IDs are included in the interworking information broker request IE. The AP which has received the interworking information broker request IE responds information of at least one interworking information broker that can acquire information from the SSPNs.

Hereinafter, a parameter included in the interworking information broker request IE shown in FIG. 11 will be described.

SSPN ID: IDs of SSPNs requested from the wireless LAN user equipment are listed by an identifier which identifies SSPN. IDs may be expressed as a type of realm. Alternatively, IDs may be expressed as a type of figure which is determined as an identifier which is unique internationally.

FIG. 12 illustrates an example of the interworking information broker IE. Hereinafter, parameters included in the interworking information broker IE shown in FIG. 12 will be described.

Result: indicates a response to the interworking information broker request, which is requested from the wireless LAN user equipment. 0x00: Success, 0x01: 1st requested broker does not exist, 0x02: 2nd requested broker does not exist, 0x03: 3rd request broker does not exist, 0xFF: No Available Broker.

In other words, the result as to whether the requested broker (interworking information broker) is available can be reported through the above result parameter Broker MAC Address: indicates broker MAC addresses which are in charge of interworking information of requested SSPN, and are listed in the same order as the requested order except for an unavailable broker which is reported through the Result parameter. In other words, address or identifier of MAC layer, which can identify an interworking information broker which acquires interworking information from a specific SSPN, can be reported through this Broker MAC Address parameter.

Figure 13:
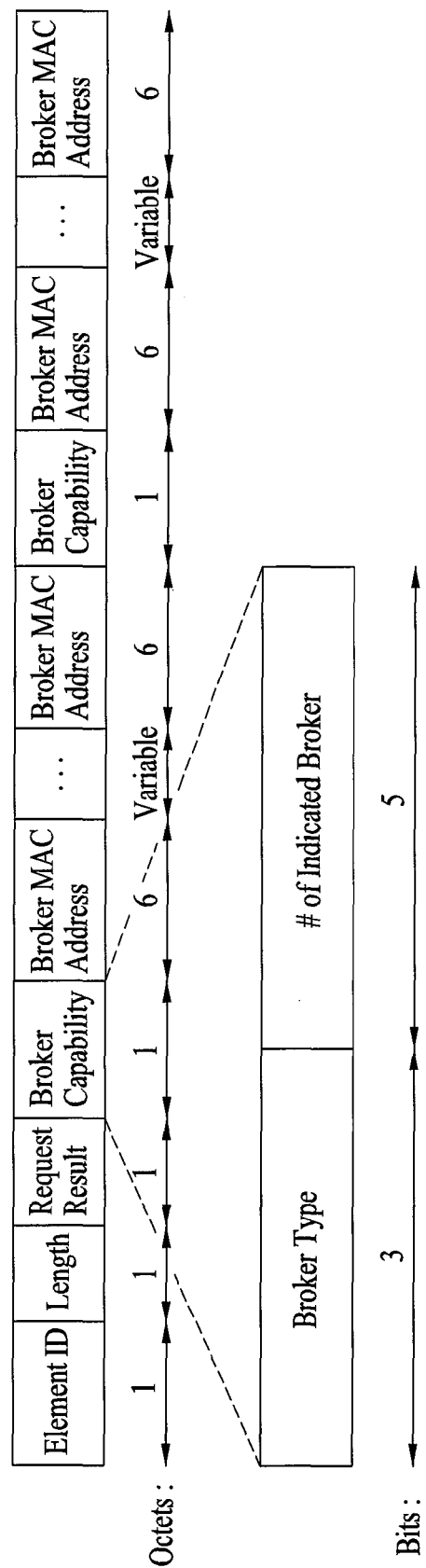
FIG. 13 illustrates another example of interworking information broker IE.

FIG. 13 illustrates another example of the interworking information broker IE. Hereinafter, broker capability parameters of the interworking information broker IE shown in FIG. 13 will be described.

Broker Type: 0b001: Interworking Information Broker, 0b010: EMID Server, 0b011: Interworking Information Broker & EMID Server combined.

The Broker Type is determined depending on a function of the broker. The wireless LAN user equipment according to the preferred embodiment of the present invention is given EMID from the EMID server or receives interworking information from the interworking information broker which has acquired the interworking information from a specific SSPN. Also, the interworking information broker and the EMID server can be realized by various types as described above. Accordingly, the interworking information broker and the EMID server can be realized by a single network entity. The network entity could be a specific AP. Accordingly, the type of the broker expressed by the above Broker Capability parameter corresponds to the interworking information broker only or the EMID server only. Alternatively, the type of the broker expressed by the above Broker Capability parameter may correspond to both the interworking information broker and the EMID server.

# of Indicated Broker: indicates either a broker of expressed in the Broker Type or the number of servers which will be listed.

There is no limitation in capability of the interworking information broker that can be expressed by the broker capability IE. For example, the capability of the interworking information broker may include interworking capabilities or general advertisement service (GAS) capability related to data acquisition from a specific network entity.

FIG. 14 illustrates an example of the EMID server IE. The AP which communicates with the wireless LAN user equipment through the EMID server IE reports MAC address of the EMID server which can communicate with the current AP within the DS to the wireless LAN user equipment.

FIG. 15 illustrates an example of interworking information request IE. The interworking information request IE can be included in interworking information action frames which will be described below.

FIG. 16 illustrates an example of interworking information response IE. The interworking information response IE can be included in interworking information action frames which will be described below.

Hereinafter, an interworking information request action frame among a plurality of interworking information action frames used in this embodiment of the present invention will be described.

FIG. 17 illustrates an example of the interworking information request action frame. Each of parameters shown in FIG. 17 will be described below.

Category: is a category value for the interworking information action frame, and is set to 7 (interworking information).

Action: is set to 1 if interworking information is requested.

STA Address: is set to MAC address of Station STA.

Destination Address: is set to MAC address of the interworking information broker which owns interworking information or can acquire the interworking information. The interworking information broker can acquire the interworking information through the beacon message suggested in this embodiment of the present invention. Also, the interworking information broker can acquire the interworking information through exchange between the probe request message and the probe response message suggested in this embodiment of the present invention.

Interworking Information Request IE: includes the interworking information request IE which requests interworking information intended to acquire. The interworking information request IE can be realized in the same manner as shown in FIG. 15.

Hereinafter, an interworking information response action frame among the plurality of interworking information action frames used in this embodiment of the present invention will be described.

Figure 18:
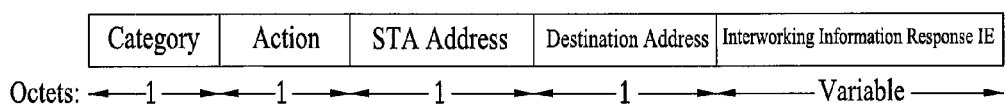
FIG. 18 illustrates an example of interworking information response action frame.

FIG. 18 illustrates an example of the interworking information response action frame.

Hereinafter, each of parameters shown in FIG. 18 will be described.

Category: is a category value for the interworking information action frame, and is set to 7 (interworking information).

Action: is set to 2 if interworking information is responded.

STA Address: is MAC address of Station STA, and is in the interworking information request action frame.

Destination Address: is set to MAC address of the interworking information broker which responds.

Interworking Information Response IE: includes the interworking information response IE which includes interworking information which STA requests. The interworking information response IE can be realized by the example of FIG. 16.

1-6. Allocation of Second Layer Temporary Address of User Equipment (STA) Using the Action Frame 1-6.1 Example of EMID Information Element Hereinafter, a method of using the interworking information action frame to allocate the second layer temporary address of the user equipment will be described.

As described above, the second layer temporary address (EMID) used instead of the actual MAC address of the user equipment can be allocated for frame exchange between the user equipment and the AP within BSS and ESS. To this end, Table 9 illustrates an example of EMID IE that can be included in the interworking information action frame.

TABLE 9

| Name | Element ID | Length (Byte) | Value |
|---|---|---|---|
| EMID | TBD | 6 | ESS MAC Identifier (EMID) is temporarily allocated on ESS. |

The user equipment and the AP can perform the procedure of allocating the second layer temporary address of the user equipment by inserting the EMID IE after the interworking information request IE of FIG. 15 or the interworking information response IE of FIG. 16 for EMID allocation during network selection of the user equipment.

1-6.2 Allocation of Temporary Address Using Separate Action Frame

Hereinafter, a method of allocating the second layer temporary address of the user equipment using a separate action frame instead of the interworking information action frame will be described.

1-6.2.1 EMID Action Frame

Hereinafter, category values, MIH information elements, action frame, and status code field for EMID allocation action frame newly prescribed for interworking information request/response will be described as follows.

TABLE 10

Category values

| Name | Value | See-sub field |
|---|---|---|
| Fast BSS Transition | 6 | 7.4.6 |
| Interworking Information | 7 | |
| EMID | 8 | |
| Reserved | 9-127 | |

TABLE 11

EMID action field values

| Action field value | Description |
|---|---|
| 0 | Reserved |
| 1 | EMID Request |
| 2 | EMID Response |
| 3-255 | Reserved |

TABLE 12

Status code field

| Status code | Meaning |
|---|---|
| 0 | successful |
| 1 | Unspecified Failure |
| 2-53 | . . . |
| 54 | Invalid PMKID |
| 55 | Invalid EAPKIE |
| 56 | Invalid Interworking Information Action Frame |
| 57 | Invalid EMID Action Frame |
| 58-65535 | Reserved |

1.6.2.2 Example of EMID Action Frame

Figure 19:
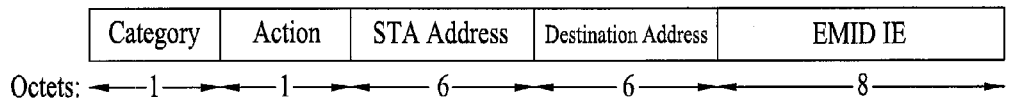
FIG. 19 illustrates an example of EMID request action frame.

FIG. 19 illustrates an example of EMID request action frame. Hereinafter, each of parameters shown in FIG. 19 will be described.

Category: is a category value for the EMID action frame, and is set to 8 (EMID).
Action: is set to 1 for EMID request.
STA Address: is MAC address of Station STA, and is given EMID temporarily allocated from the AP or actual MAC address of STA.
Destination Address: is MAC address of the EMID broker or the EMID server which allocates and manages EMID, and is acquired through the beacon message.
EMID IE: includes previously allocated EMID of the user equipment. EMID IE is omitted if there is no previously allocated EMID.

Figure 20:
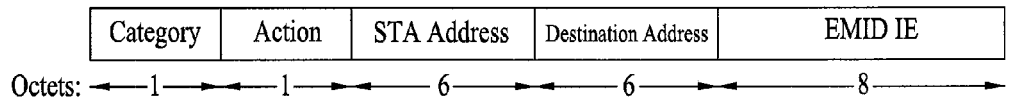
FIG. 20 illustrates an example of EMID response action frame.

FIG. 20 illustrates an example of EMID response action frame. Hereinafter, each of parameters shown in FIG. 20 will be described.

Category: is a category value for the EMID action frame, and is set to 8 (EMID).
Action: is set to 2 for EMID request.
STA Address: is MAC address of Station STA, and is in the EMID request action frame.
Destination Address: is MAC address of the EMID broker or the EMID server which responds.
EMID IE: includes EMID allocated to the user equipment.

Hereinafter, a method of acquiring the interworking information or the EMID using the aforementioned message and frame will be described.

Figure 21:
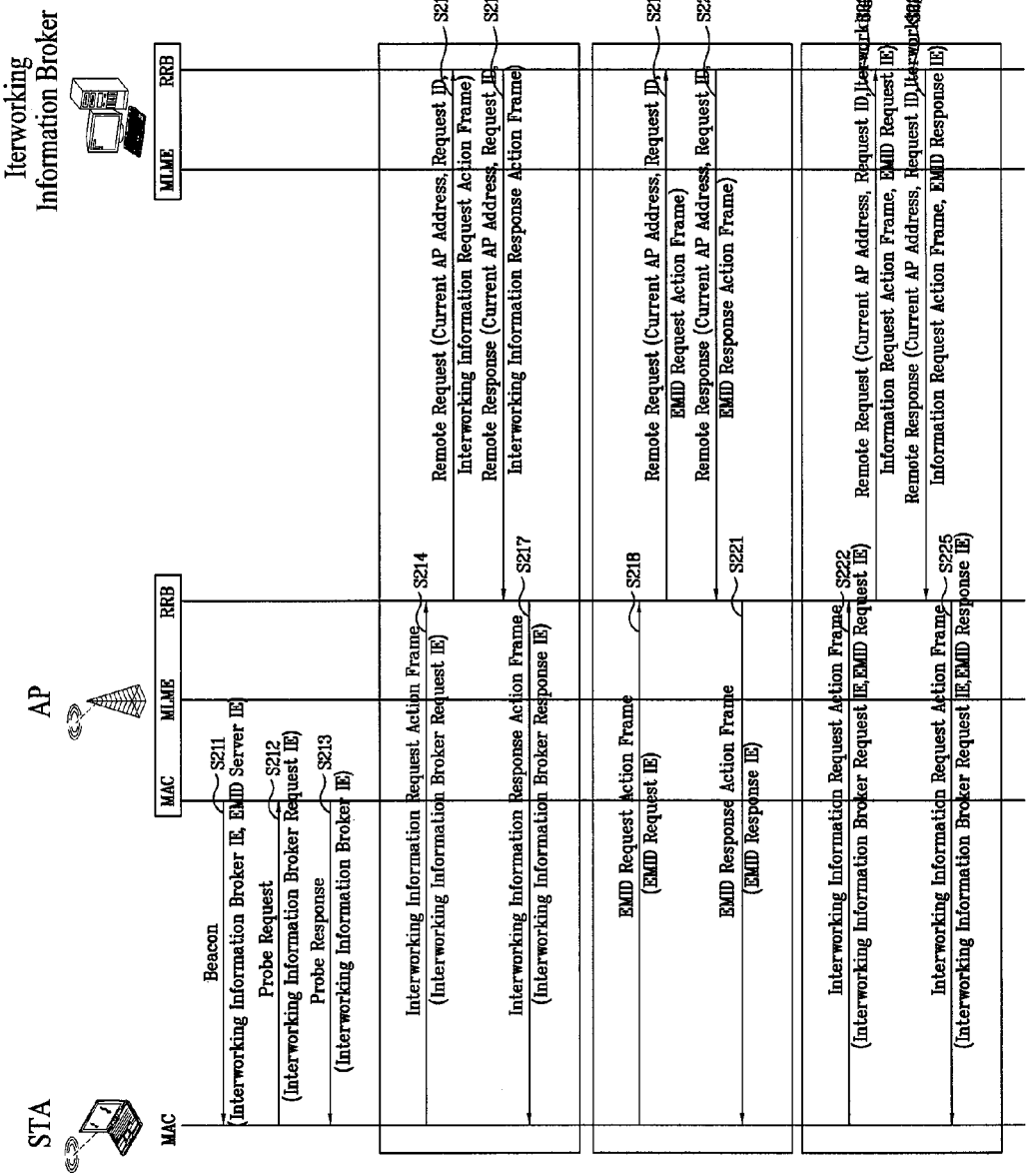
FIG. 21 is a flow chart illustrating a method for performing communication with an interworking information broker in accordance with the preferred embodiment of the present invention.

FIG. 21 is a flow chart illustrating a method for performing communication with the interworking information broker in accordance with this embodiment of the present invention.

The AP, which the wireless LAN user equipment desires to access, can broadcast information of the interworking information broker within the DS with which the AP can communicate with, through the beacon message according to this embodiment of the present invention. As described above, the broadcasted information includes address information of the interworking information broker and address information of the EMID server. The information of the interworking information broker and the information of the EMID server may respectively be transmitted by their respective IE. Alternatively, the information of the interworking information broker and the information of the EMID server may be transmitted by one IE (S211).

The wireless LAN user equipment which has not obtained the information through the beacon message requests the information of the interworking information broker through the probe request message according to this embodiment of the present invention. Since the wireless LAN user equipment transmits SSPN ID corresponding to desired interworking information along with the probe request message, the AP which has received the probe request message transmits only address information of the interworking information broker which can acquire interworking information of the SSPN ID (S212). In this case, the AP transmits address information of the interworking information broker which can acquire the interworking information of SSPN ID requested from the user equipment. Also, if the request message of the user equipment does not include SSPN ID, the AP transmits all of address information of all interworking information brokers (S213).

The user equipment which has acquired address information of the interworking information broker through the step S211 or the steps S212 to S213 transmits the interworking information request action frame which requests interworking information (interworking information broker request IE) to the AP along with address information of the interworking information broker (S214).

The AP transmits the remote request frame to the interworking information broker included in the interworking information request action frame, wherein the interworking information request action frame received from the user equipment is encapsulated in the remote request frame (S215). The action frame is included in the second layer message by the above encapsulation action. In other words, the action frame is included in Ethernet frame or wire LAN message. The interworking information broker which has received the remote request frame transmits the remote response frame to the AP, wherein the remote response frame includes the interworking information requested from the user equipment (S216). The interworking information response action frame is encapsulated in the remote response frame. The AP decapsulates the encapsulation of the remote response frame to extract the interworking information response action frame. The AP transmits the interworking information response action frame to the user equipment which has transmitted the interworking information request action frame (S217).

The user equipment can acquire EMID by performing steps corresponding to the steps S218 to S221. To request the EMID server of EMID allocation to acquire EMID, the user equipment sets a destination parameter of the EMID request action frame as EMID server address (EMID server address obtained through the beacon message or the probe request/response messages according to this embodiment of the present invention) and transmits the same to the current AP (S218). As described above, the EMID server and the interworking information broker can be realized by various types. The interworking information broker can also perform the function of the EMID server. The AP encapsulates the received EMID request action frame in the remote request frame and forwards the encapsulated action frame to the EMID server (S219). The EMID server generates EMID response action frame according to this embodiment of the present invention for EMID allocation, encapsulates the generated EMID response action frame in the remote response frame, and forwards the remote response frame to the AP which has transmitted the remote request frame (S220). The AP which has received the remote response frame decapsulates the encapsulation to extract the EMID response action frame and forwards the EMID response action frame to the user equipment corresponding to STA address within the action frame (S221).

The user equipment can acquire EMID and at the same time request interworking information by performing steps S222 to S225 corresponding to the steps S214 to S217. In this case, the network entity which performs the function of the EMID server and the network entity which performs the function of the interworking information broker should have the same MAC address.

Figure 22:
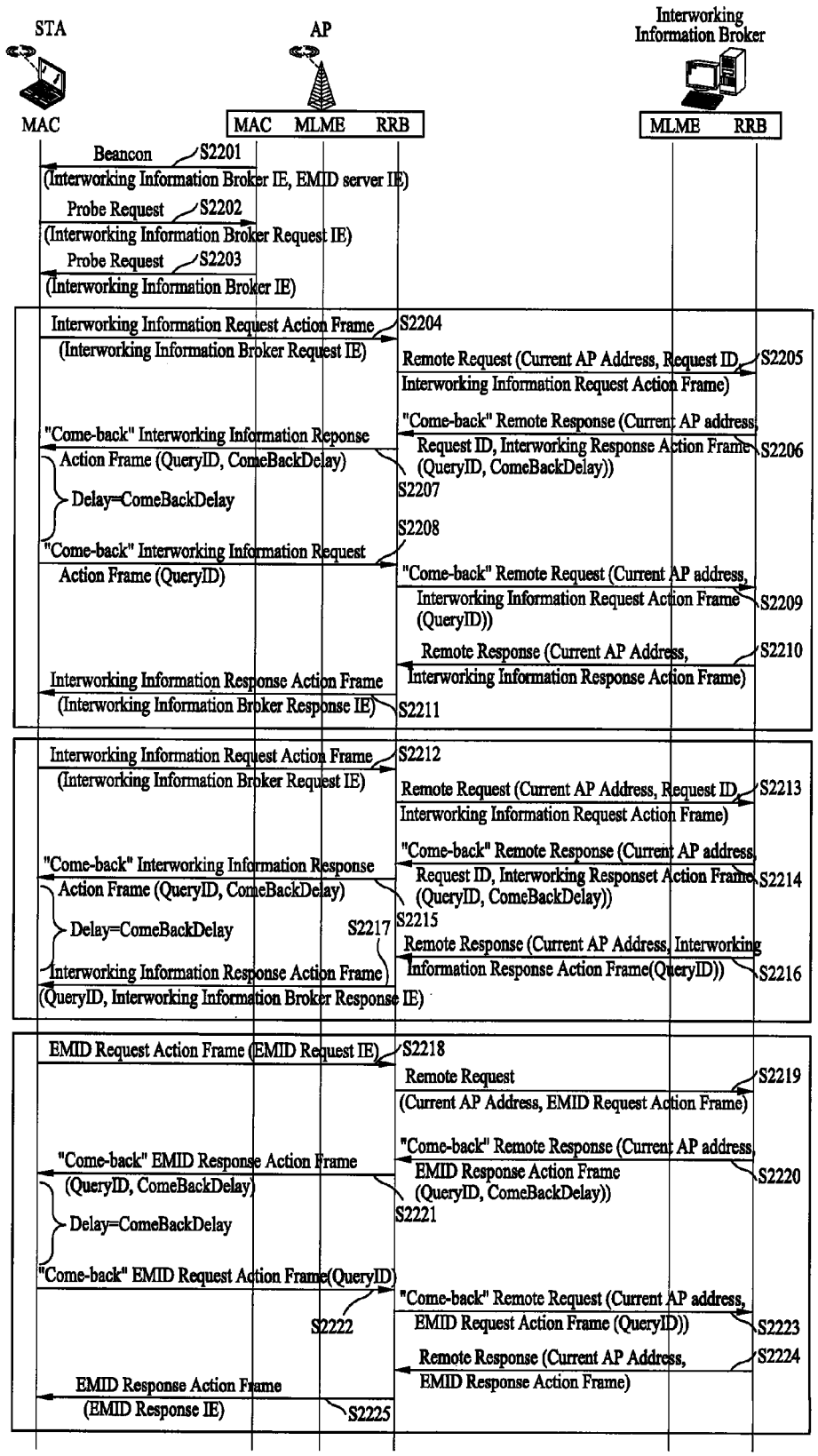
FIG. 22 is another flow chart in accordance with the preferred embodiment of the present invention.

FIG. 22 is another flow chart according to the preferred embodiment of the present invention. When the interworking information broker or the EMID server acquires the interworking information or allocates the EMID, the interworking information broker or the EMID server may fail to immediately provide the requested interworking information or EMID to the user equipment. In this case, referring to FIG. 22, the AP reports the user equipment to transmit the interworking information or EMID after a specific time and transmits query ID in response to the request of the user equipment.

Figure 7:
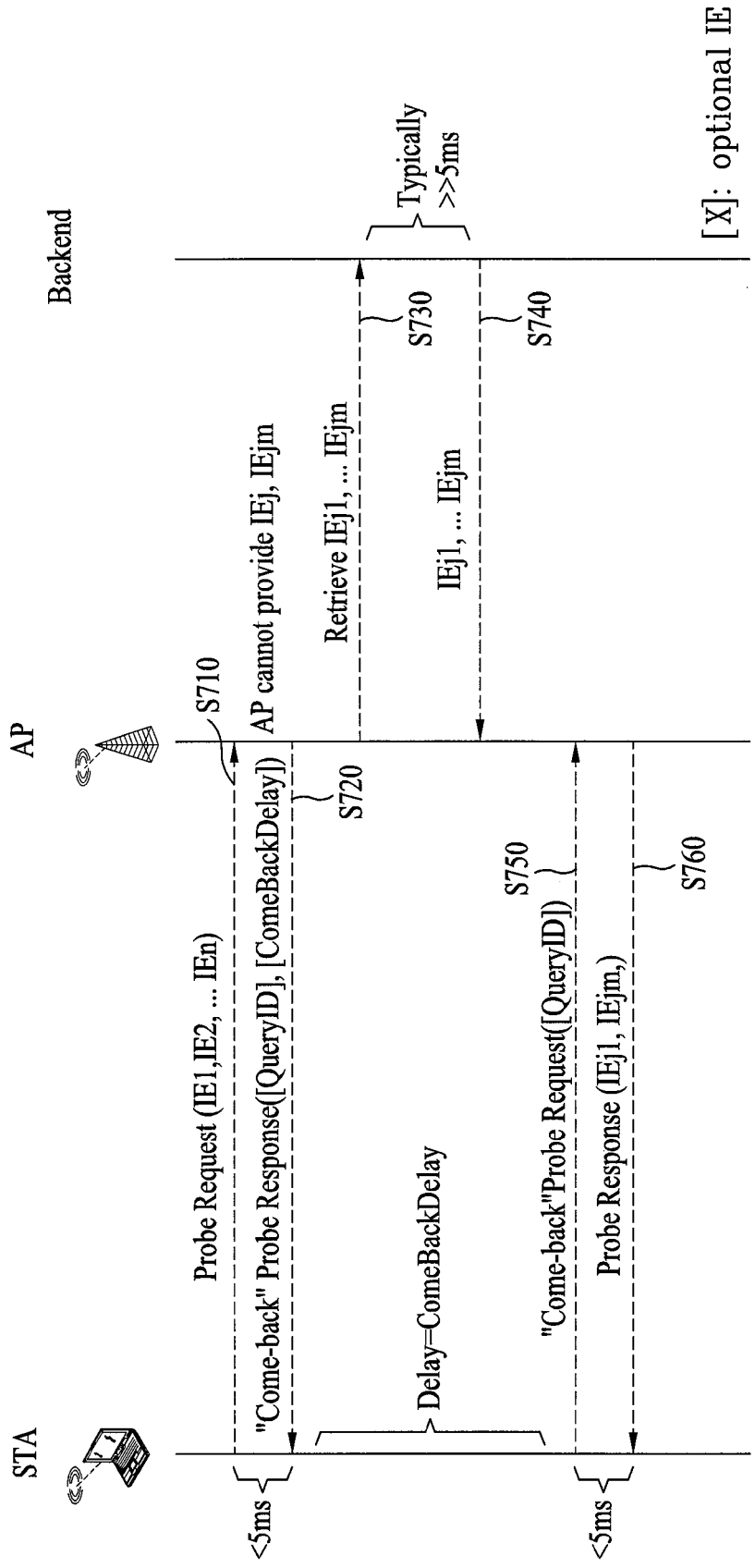
FIG. 7 illustrates a series of procedures of requesting and acquiring interworking information in a wireless LAN user equipment in accordance with the related art.
Figure 8:
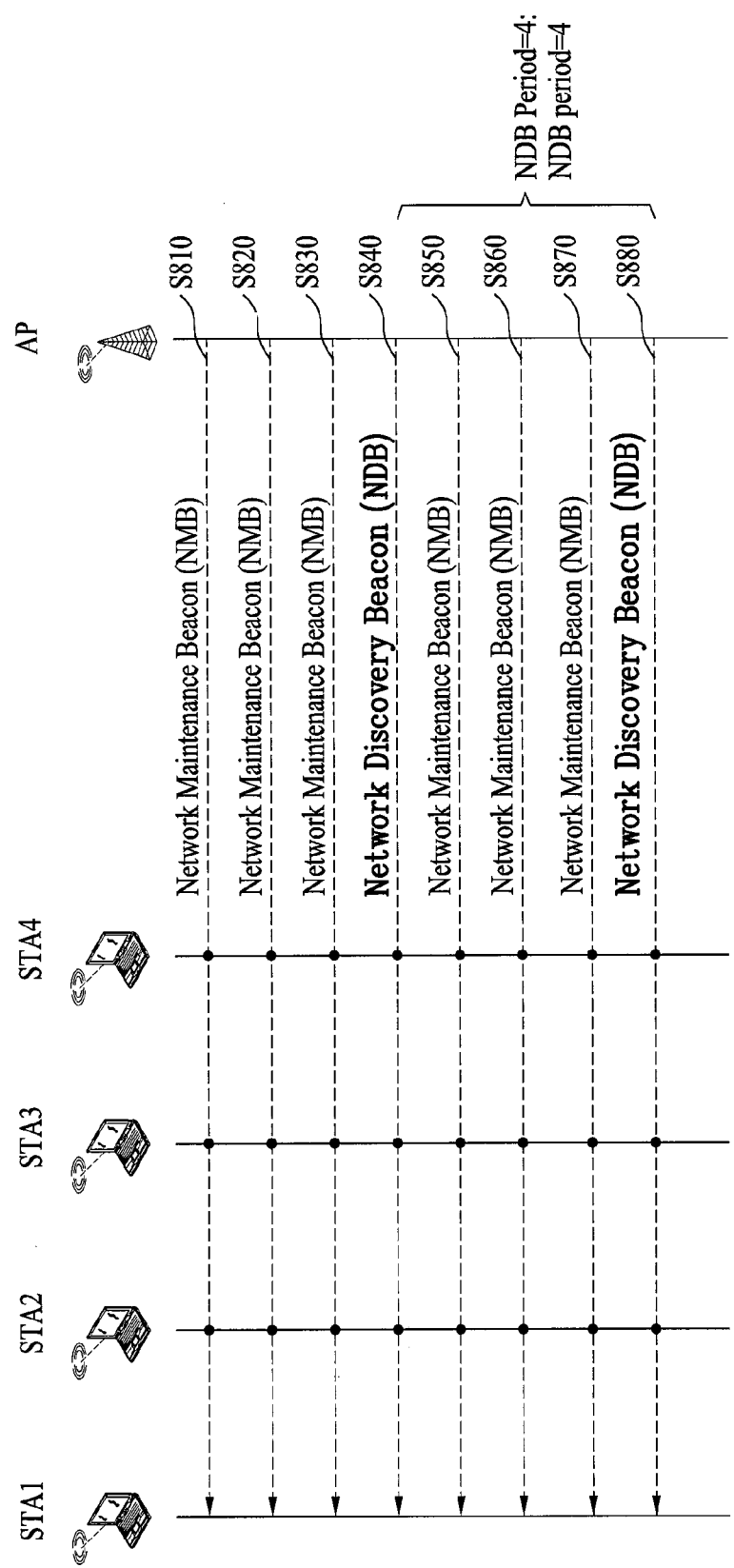
FIG. 8 illustrates an example of a method for periodically transmitting NMB and NDB.
Figure 9:
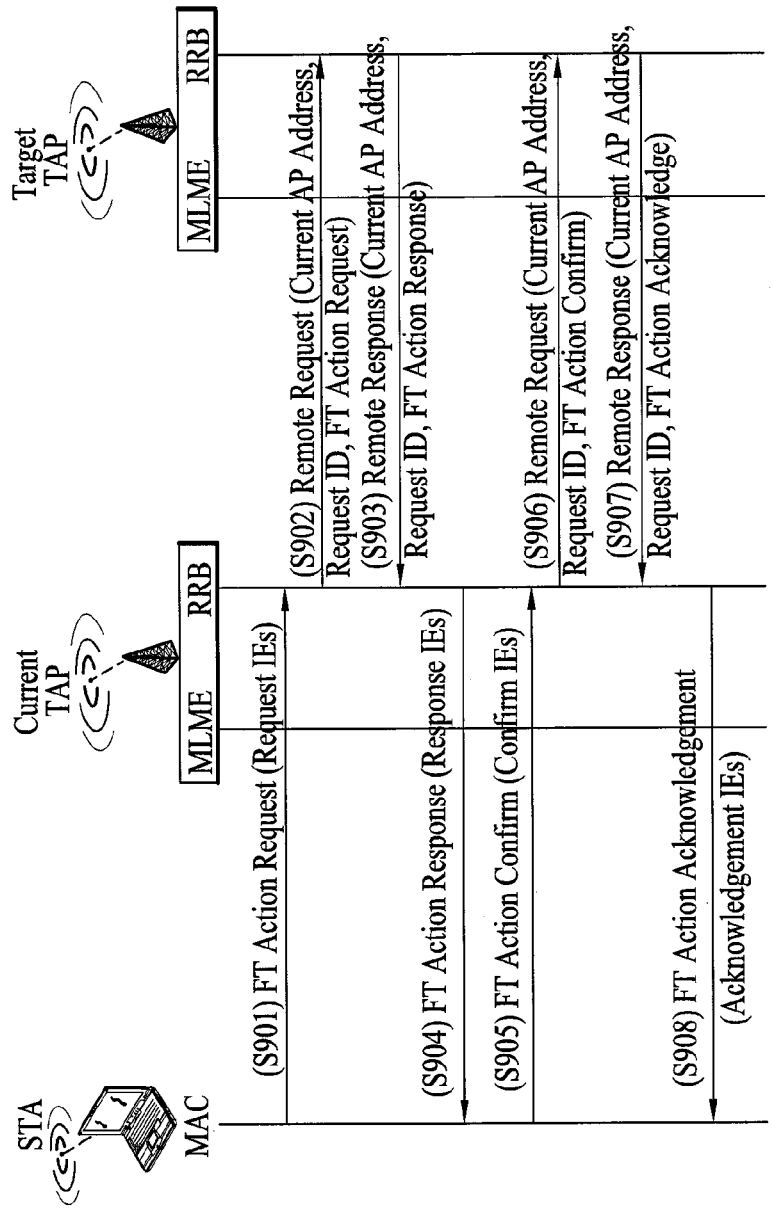
FIG. 9 is a flow chart illustrating a method for performing communication between two APs through a DS.

In the embodiment of FIG. 22, the communication method of FIG. 7 is applied to steps S2204 to S2211. Also, steps S2212 to S2217 illustrate that the AP transmits information at a retransmission timing point reported to the user equipment even if the user equipment does not transmit a separate request message at the retransmission timing point reported from the AP. Also, in the embodiment of FIG. 22, the communication method of FIG. 7 is applied to steps S2218 to S2225 when the EMID is acquired.

The AP, which the wireless LAN user equipment desires to access, can broadcast information of the interworking information broker within the DS with which the AP can communicate, through the beacon message according to this embodiment of the present invention. As described above, the broadcasted information includes address information of the interworking information broker and address information of the EMID server. The information of the interworking information broker and the information of the EMID server may respectively be transmitted by their separate IE. Alternatively, the information of the interworking information broker and the information of the EMID server may be transmitted by one IE (S2201).

The wireless LAN user equipment which has not obtained the information through the beacon message requests the information of the interworking information broker through the probe request message according to this embodiment of the present invention. Since the wireless LAN user equipment transmits SSPN ID corresponding to desired interworking information along with the probe request message, the AP which has received the probe request message transmits only address information of the interworking information broker which can acquire interworking information of the SSPN ID (S2202). In this case, the AP transmits address information of the interworking information broker which can acquire the interworking information of SSPN ID requested from the user equipment. Also, if the request message of the user equipment does not include SSPN ID, the AP transmits all of address information of all interworking information brokers (S2203).

The user equipment which has acquired the address information of the interworking information broker through the step S2201 or the steps S2202 to S2203 transmits the interworking information request action frame which requests interworking information to the AP along with the address information of the interworking information broker (S2204). The AP transmits the remote request frame to the interworking information broker included in the interworking information request action frame, wherein the interworking information request action frame received from the user equipment is encapsulated in the remote request frame (S2205). In the case that the interworking information broker which has received the remote request frame cannot provide the interworking information, the interworking information broker transmits the remote response frame to the AP, wherein the interworking information response action frame which includes timing information ComeBackDelay as to when to transmit interworking information request and ID (Query ID) for identifying request of the interworking information is encapsulated in the remote response frame (S2206). The AP decapsulates the encapsulation of the remote response frame to extract the interworking information response action frame. The AP transmits the interworking information response action frame which includes ComeBackDelay and Query ID to the user equipment which has transmitted the interworking information request action frame (S2207).

The user equipment transmits the interworking information request action frame at a scheduled time for requesting the interworking information, i.e., retransmission time ComeBackDelay of the interworking information. At this time, the user equipment requests the interworking information along with the Query ID received through the step S2207 (S2208). Since the Query ID is also requested, there is no need to indicate the interworking information again.

The AP transmits the remote request frame to the interworking information broker included in the interworking information request action frame, wherein the interworking information request action frame is encapsulated in the remote request frame (S2209). The interworking information broker which has received the remote request frame transmits the remote response frame to the AP through the Query ID, wherein the interworking information response action frame which includes interworking information previously requested from the user equipment is encapsulated in the remote response frame (S2210). The AP decapsulates the encapsulation of the remote response frame to extract the interworking response action frame. The AP transmits the interworking information response action frame to the user equipment which has transmitted the interworking information request action frame (S2211).

If the interworking information broker cannot provide the interworking information, the user equipment can acquire the interworking information by performing steps S2212 to S2217 corresponding to the steps S2201 to S2211.

The user equipment which has acquired the address of the interworking information broker through the step S2201 or the steps S2202 to S2203 transmits the interworking information request action frame which requests interworking information (interworking information broker request IE) to the AP along with address information of the interworking information broker (S2212). The AP transmits the remote request frame to the interworking information broker included in the interworking information request action frame, wherein the interworking information request action frame received from the user equipment is encapsulated in the remote request frame (S2213). In the case that the interworking information broker which has received the remote request frame cannot provide the interworking information, the interworking information broker transmits the remote response frame to the AP, wherein the interworking information response action frame which includes timing information ComeBackDelay as to when to transmit interworking information and ID (Query ID) for identifying request of the interworking information is encapsulated in the remote response frame (S2214). The AP decapsulates the encapsulation of the remote response frame to extract the interworking information response action frame, and transmits the interworking information response action frame which includes ComeBackDelay and Query ID to the user equipment which has transmitted the interworking information request action frame (S2215).

The interworking information broker transmits the remote response frame to the AP at the scheduled time ComeBackDelay of the interworking information, wherein the interworking information response action frame which includes Query ID and interworking information previously requested from the user equipment is encapsulated in the remote response frame (S2216). The AP decapsulates the encapsulation of the remote response frame to extract the interworking information response action frame. The AP transmits the interworking information response action frame which includes Query ID to the user equipment which has transmitted the interworking information request action frame (S2217). The user equipment acquires the interworking information by receiving the interworking information response action frame transmitted at ComeBackDelay.

In the case that the EMID server cannot immediately perform EMID allocation, the user equipment can acquire EMID by performing steps S2218 to S2225 corresponding to the steps S2204 to S2211 or the steps S2212 to S2217. The user equipment sets a destination parameter of the EMID request action frame as EMID server address (EMID server address obtained through the beacon message or the probe request/response messages according to this embodiment of the present invention) and transmits the same to the current AP (S2218). As described above, the EMID server and the interworking information broker can be realized by various types. The interworking information broker can also perform the function of the EMID server. The AP encapsulates the received EMID request action frame in the remote request frame and forwards the encapsulated action frame to the EMID server (S2219). In the case that the EMID server which has received the remote request frame cannot immediately perform EMID allocation, the EMID server forwards the remote response frame to the AP, wherein the EMID response action frame which includes timing information ComeBackDelay as to when to transmit EMID allocation request and ID (Query ID) for identifying the EMID allocation request is encapsulated in the remote response frame (S2220). The AP decapsulates the encapsulation of the remote response frame to extract the EMID response action frame, and transmits the EMID response action frame which includes ComeBackDelay and Query ID to the user equipment which has transmitted the EMID request action frame (S2221). The user equipment transmits the EMID request action frame at a scheduled time for requesting EMID allocation, i.e., retransmission time ComeBackDelay of EMID allocation information. At this time, the user equipment requests the EMID allocation along with the Query ID received through the step S2221 (S2222). The AP transmits the remote request frame to the EMID server included in the EMID request action frame, wherein the EMID request action frame is encapsulated in the remote request frame (S2209). The EMID server which has received the remote request frame transmits the remote response frame to the AP through Query ID, wherein the EMID response action frame which includes EMID previously requested from the user equipment is encapsulated in the remote response frame (S2222). The AP decapsulates the encapsulation of the remote response frame to extract the EMID response action frame. The AP transmits the EMID response action frame to the user equipment which has transmitted the EMID request action frame (S2223).

Furthermore, the user equipment can be allocated with EMID from the EMID server similarly to the steps S2212 to S2217, wherein the steps S2223 and S2224 are omitted.

SECOND EMBODIMENT

The second embodiment of the present invention relates to a method of forwarding interworking information to a wireless LAN user equipment, and more particularly to, message transmission in which resource consumption is minimized in transmitting the interworking information under the wireless environment.

Hereinafter, examples of a probe request message, a probe response message, and a beacon message used in this embodiment of the present invention will be described. Each of the messages is improved from a wireless LAN (IEEE 802.11) message.

2-1. Probe Request Message

The following messages are used to cancel transmission of interworking information previously requested. Query ID can be used to identify the interworking information which is cancelled.

TABLE 13

| Order | Information | Notes |
|---|---|---|
| 1 | SSID | |
| 2 | Supported rates | |
| 3 | Query Request Cancel | includes when requested information is cancelled. |

2.2 Probe Response Message

Network discovery beacon information (NDB information) additionally provided in accordance with this embodiment of the present invention can be inserted to the beacon message. If the NDB information is not inserted to the beacon message, the NDB information may be inserted to the probe response message and then transmitted from the AP.

TABLE 14

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |
| 10 | Network Discovery Beacon Information | indicates information as to when NDB is transmitted and as to whether to include interworking information. Namely, in case of Next NDB = 0, the interworking information is included in the probe response message. If Next NDB = 0 is not obtained, the interworking information is not included in the probe response message. Namely, Next NDB information which reports a transmission timing point of NDB is included in the probe response message. |
| 11 | Interworking Information | Information of requested interworking, i.e., interworking information is transmitted. If AP does not have interworking information which is requested, ComeBackDelay information indicating as to when to transmit information to the user equipment is included. In this case, Query ID of interworking information requested from the user equipment is included. |

2.3 Beacon Message

In this embodiment of the present invention, network discovery beacon information for indicating interworking information and period information of network discovery beacon (NDB) is added to the existing beacon message.

TABLE 15

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | |
| 7 | DS Parameter Set | |
| 8 | CF Parameter Set | |
| 9 | IBSS Parameter Set | |
| 10 | TIM | |
| 11 | Network Discovery Beacon Information | Information as to when to transmit NDB and whether to include interworking information are indicated. Namely, in case of Next NDB = 0, the interworking information is included in the beacon message. If Next NDB = 0 is not obtained, the interworking information is not included in the beacon message. Namely, Next NDB information which reports a transmission timing point of NDB is only included. |
| 12 | Interworking Information | Information of requested interworking, i.e., interworking information is transmitted. If AP does not have interworking information which is requested, ComeBackDelay information indicating as to when to transmit information to the user equipment is included. In this case, Query ID of interworking |

TABLE 15-continued

| Order | Information | Notes |
|---|---|---|
| | | information requested from the user equipment is included. |

Figure 23A:
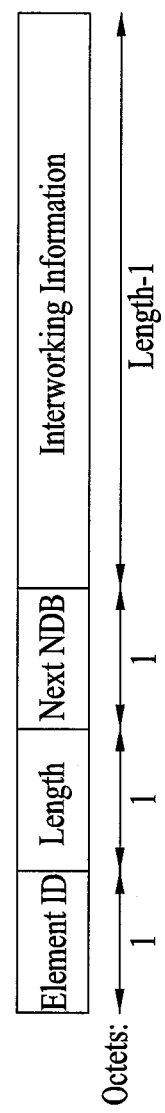
FIG. 23A illustrates an example of an information element of network discovery beacon information (i.e., NDB information)

2.4 Method of Realizing the Network Discovery Beacon Information IE and the Interworking Information IE, and Request Cancel IE FIG. 23A illustrates an example of an information element (IE) of the network discovery beacon information (i.e., NDB information). In the information element of the NDB information, in case of Next NDB=0, the interworking information is included after the Next NDB list. Also, in case of no Next NDB=0, the Next NDB is only included but the interworking information is not included.

The Next NDB can be used as information indicating as to when to transmit a beacon, which includes interworking information, i.e., the NDB. Namely, the Next NDB indicates a transmission interval of NDB which is transmitted later. For example, if a beacon interval where the NDB and NMB beacon are transmitted is 100 ms and Next NDB is 5, the next fifth beacon interval, i.e., the beacon transmitted after 500 ms is the beacon message which includes the interworking information. In other words, the beacon transmitted after 500 ms becomes the NDB.

2.5 Advertisement Request IE

Hereinafter, advertisement request IE for interworking information request of the user equipment will be described. The user equipment transmits the probe request or the action frame which requests interworking information to the AP along with desired SSPNs so as to request the interworking information.

TABLE 16

| Field | Size |
|---|---|
| Element ID | Unit 8 |
| Length | Unit 8 |
| Advertisement Service | Unit 8 |
| Advertisement Type | Unit 8 |
| Advertisement Identifier | Unit 8 * 2 |
| SSPN ID #1 | TBD |
| SSPN ID #2 | TBD |
| SSPN ID #N | TBD |
| 802.21 Information Service Query Frame | TBD |

Hereinafter, fields of Table 16 will be described.
Advertisement Service
0: SSPN Advertisement
1-255: Reserved
Advertisement Type
0: Ethertype
1: well-known port
2-255: reserved
Advertisement Identifier: unique value per advertisement type
802.21 Information Service Query Frame: if an upper entity is a media independent handover function entity, includes a query request frame transmitted from this entity.

2.6 Advertisement Response IE

The advertisement response IE is included in the probe response and is a response to advertisement request IE transmitted from the user equipment.

The advertisement response IE includes multicast address for multicasting the interworking information requested from the user equipment. In more detail, the AP includes the multicast address to provide interworking information acquired through query to an entity (for example, advertisement server or corresponding SSPN) which knows the interworking information requested from the user equipment.

In the case that the AP can provide information before time out of a request message at the time when information is requested from the user equipment, the AP may transmit the information along with advertisement which is information requested from the user equipment. This message may be unicasted to the user equipment or may be broadcasted to all the user equipments. In this case, multicast address may be omitted.

TABLE 17a

| Field | Size |
| --- | --- |
| Element ID | Unit 8 |
| Length | Unit 8 |
| Status Code | Unit 8 |
| Advertisement (if any) | Unit N |
| Multicast Address | Unit 8 * 6 |

Hereinafter, fields of Table 17a will be described.

Status Code

0x00: successful (the case where information of the requested SSPN ID can be provided. If the information can immediately be provided, the information can be transmitted along with advertisement.)

0x01: Request has been accepted.

0x02: Request has been declined.

0x03: Service not supported.

0x04: First requested SSPN information does not exist.

0x05: Second requested SSPN information does not exist.

0x06: Third requested SSPN information does not exist.

Hereinafter, another example of advertisement response IE will be described with reference to Table 17b below.

TABLE 17b

| Field | Size |
| --- | --- |
| Element ID | Unit 8 |
| Length | Unit 8 |
| Status Code | Unit 8 |
| Multicast Address | Unit 8 * 6 |
| Query Response Waiting Time | Unit 8 |

Status codes of Table 17b will be described with reference to Table 17c below.

TABLE 17c

| Status Code field value | Description |
| --- | --- |
| 0 | Successful and information delivery using B-SNA beacon indication (indicates that information which AP acquires through query using Advs server (advertisement server), MIH server, and the like will be forwarded after B-SNA beacon is received.) |
| 1 | Successful and immediate information delivery (indicates that information requested within a specific time after AP transmits Probe response will be forwarded (through action frame). This is set when AP |

TABLE 17c-continued

| Status Code field value | Description |
| --- | --- |
|  | caches previous information in its buffer or acquires information within a short time to forward the information within a query response waiting time. If this bit is set, query response waiting time may be set and transmitted. The query response waiting time is used as a waiting time which Station waits for query response which will be forwarded from the AP. If query response waiting time is not transmitted, station uses a query response waiting time which is a previously determined default value.) |
| 3 | Request has been declined |
| N | Service not supported |
| N + 1 | Wildcard not supported |
| N + 2 | Null SSPN field not supported |
| 4-255 | Reserved |

A concept of B-SNA beacon of Table 17c will be described below.

The B-SNA beacon is a concept similar to DTIM beacon for minimizing power consumption. However, the B-SNA beacon does not overlap the DTIM beacon and is to indicate that advertisement action frame will be transmitted after the B-SNA beacon.

2-7. Query Response (Action Frame)

The query response is a frame for transmitting interworking information from the AP to the user equipment, wherein the interworking information is acquired through query.

Frames of FIGS. 23B to 23H are preferably located in a frame body 11 of FIG. 1. Accordingly, MAC frame used in this embodiment of the present invention includes 802.11 MAC header shown in FIG. 1 and the frames of FIGS. 23B to 23H.

Figure 23B:
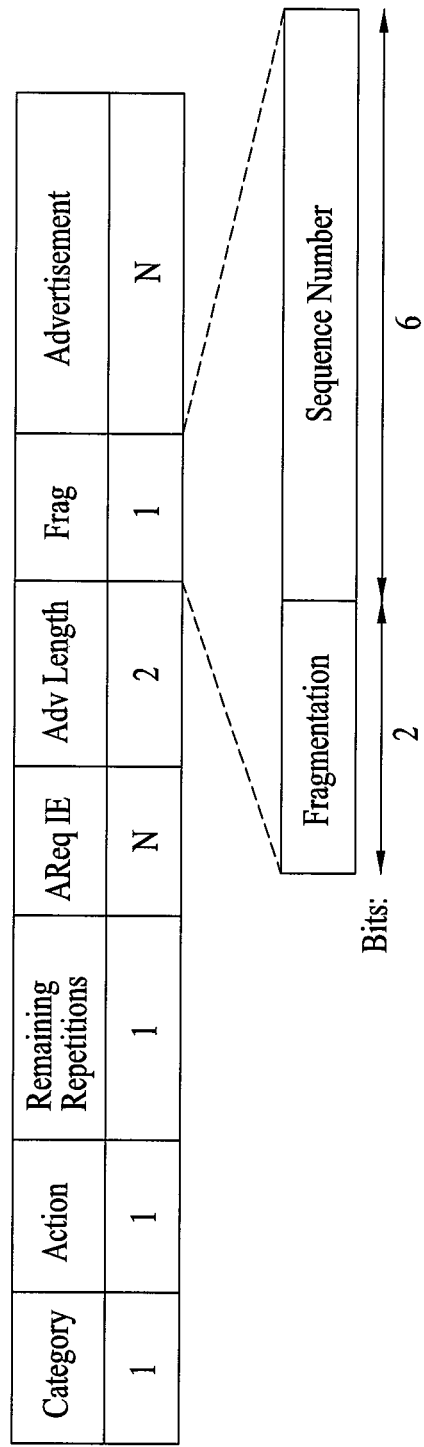
FIG. 23B is a block diagram illustrating an example of a query response frame structure.

FIG. 23B is a block diagram illustrating an example of a structure of a query response frame.

The example of FIG. 23B illustrates an action frame which undergoes fragmentation due to long sized advertisement and is transmitted in several fragments. In other words, if one advertisement is longer than a preset length, it is preferably divided into a plurality of fragments.

In this case, fragmentation is preferably performed as follows.

00: Unfragmented

01: First fragment

10: Continued fragment

11: Last fragment

As shown, the information which the AP has acquired through query can be divided into a plurality of fragments by a fragmentation field of a specific bit and a sequence number field of a specific bit.

Furthermore, as described above, the fragment field can indicate whether a corresponding fragment belongs to the first fragment or the last fragment.

The sequence number field can indicate to what fragment a corresponding fragment belongs.

Generally, the sequence number field increases or decreases as data are forwarded thereto. Accordingly, it is possible to identify a corresponding fragment as a value of the sequence number field increases or decreases from a random value.

Figure 23C:
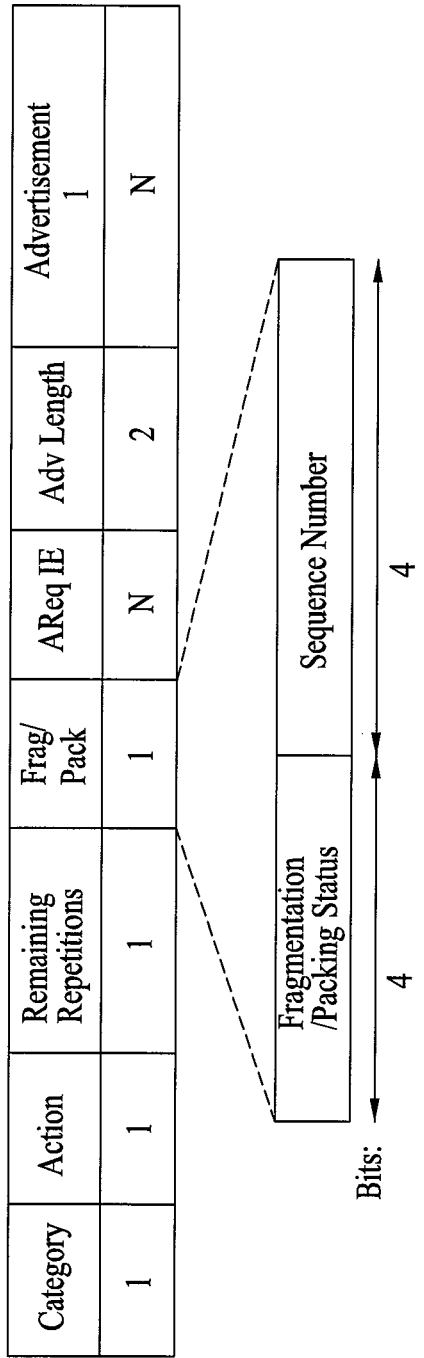
FIG. 23C is a block diagram illustrating another example of a query response frame structure.

FIG. 23C is a block diagram illustrating another example of a structure of a query response frame. Specifically, the example of FIG. 23C illustrates another example of an action frame which transmits interworking information to the user equipment. The action frame of FIG. 23C is used for one or more kinds of interworking information.

Figure 23D:
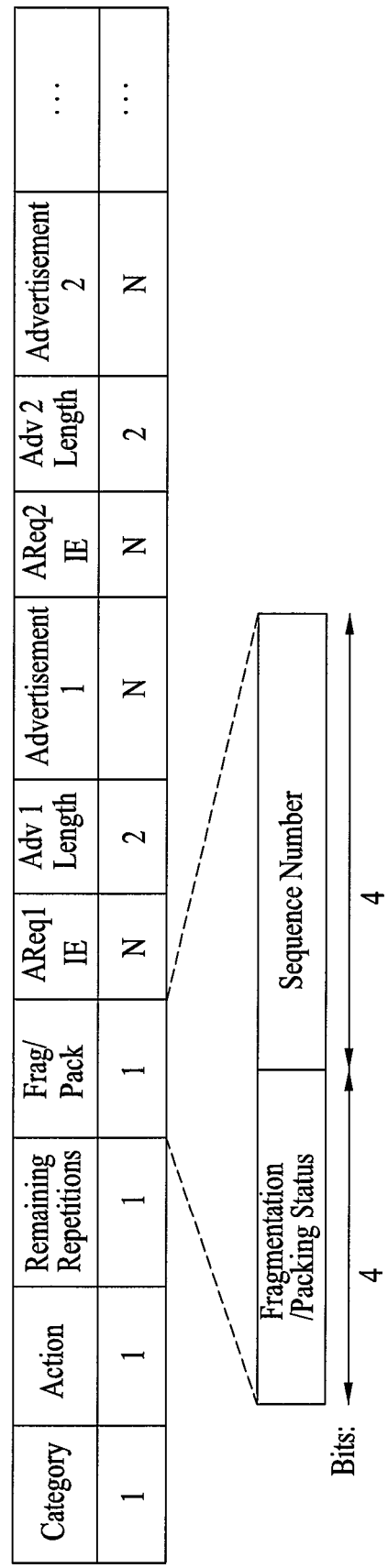
FIG. 23D is an example of an action frame when a response to at least one AReq IE is packed and transmitted.

FIG. 23D is an example of an action frame when a response to at least one AReq IE is packed and transmitted.

Data shown in FIG. 23D will be described below.

TABLE 18

| -Category | | |
|---|---|---|
| Name | Value | Description |
| ... | ... | ... |
| Generic Advertisement Service | 6 | Advertisement |

TABLE 18

| -Action | |
|---|---|
| Action field value | Description |
| 0 | SSPN Advertisement |
| 1-255 | Reserved |

Remaining Repetitions: the number of times of additionally transmitted Advertisement Adv Length: Length of Advertisement Frag/Pack: Fragmentation or Packing of Advertisement. This Frag/Pack may include response advertisement to several types of AReq IE, or the Frag/Pack including response advertisement to several types of AReq IE may be transmitted in fragmentation. First 4 bits represent the status of packing and fragmentation, and the other 4 bits represent a sequence number. The sequence number is used when respective packets transmitted in fragmentation are combined with one another.

Fourth bit: indicates as to whether Packeting is used.

Third bit: indicates as to whether intermediate of advertisement is cut.

Second bit and first bit: indicate fragmentation and as to whether this is first, intermediate, or last fragmentation.

0000: neither Packing nor Fragmentation is used.

0001: Packing is not used. Fragmentation is used (first fragment).

0010: Packing is not used. Fragmentation is used (intermediate fragment).

0011: Packing is not used. Fragmentation is used (last fragment).

1000: packing is used for two or more advertisements, and Fragmentation is not used.

1001: packing is used for two or more advertisements, and Fragmentation is used (first fragment).

1010: packing is used for two or more advertisements, and Fragmentation is used (intermediate fragment).

1011: packing is used for two or more advertisements, and Fragmentation is used (last fragment).

x0xx: fragment is used at the end of advertisement and starts from new AReq IE.

x1xx: fragment is used at the middle of advertisement, and IE indicating length of advertisement follows immediately.

FIGS. 23E and 23F are examples of formats of the action frame when the Frag/Pack is the intermediate fragment or the last fragment during fragmentation.

Fragmentation can be performed at advertisement. For example, fragmentation can be performed at the middle of advertisement or at the time when advertisement ends.

Although FIG. 23E illustrates that fragmentation is performed for only one advertisement when fragmentation is performed at the end of advertisement, the present invention is not limited to the example of FIG. 23E. Namely, in accordance with the embodiment of the present invention, fragmentation may be performed for several advertisements.

Although FIG. 23F illustrates that fragmentation is performed for only one advertisement when fragmentation is performed at the middle of advertisement, the present invention is not limited to the example of FIG. 23F. In other words, in accordance with this embodiment of the present invention, fragmentation may be performed for several advertisements.

If two fragments are provided by fragmentation, an action frame which indicates a first fragment and the last fragment without indicating an intermediate fragment is transmitted.

Advertisement: is requested information. A query response frame of information service prescribed by the IEEE 802.21 standard may be inserted to Advertisement.

FIG. 23G illustrates another example of the query response action frame. The example of FIG. 23G illustrates that an Ack field is inserted to transmit Act message to the action frame transmitted from the AP if only one user equipment requests AReq IE. The number of user equipments which request AReq IE corresponds to the number of user equipments which report a single multicast address to Advertisement response IE of the probe response for a time period set by the AP or until the query response action frame is transmitted. If the number of the user equipments is only one, the query response action frame is transmitted to the multicast address. However, since Ack will surely be received at the request of Ack, repeated transmission is not required. If two or more user equipments receive the query response action frame as the multicast address is transmitted to the two or more user equipments, Ack bit is not set. If the two or more user equipments receive the query response action frame, transmission is performed several times using a remaining repetition value, whereby reliability in transmission of information is improved.

The Ack field value included in FIG. 23 can be provided as shown in Table 20 below.

TABLE 20

| Ack field value | Description |
|---|---|
| 0 | Ack not Required |
| 1 | Ack Required |
| 2-255 | Reserved |

The Ack field value can be set as follows in accordance with the example of Table 20.

0: Ack not required bit ('0') is set for transmission of the action frame which is multicasted for a plurality of user equipments.

1: The AP requests one user equipment to set Ack required bit ('1') when multicast address is used to transmit the action frame to the user equipment, so that the user equipment transmits Ack message to the AP in response to the received action frame.

Figure 23H:
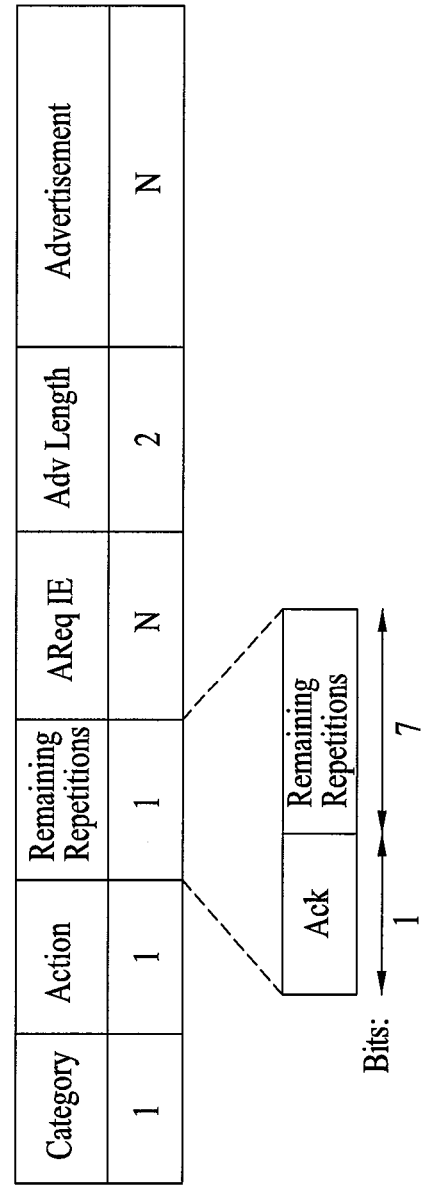
FIG. 23H illustrates another example of a query response action frame.

FIG. 23H illustrates another example of the query response action frame. The example of FIG. 23H illustrates that some of remaining repetitions is used as a bit which performs Ack request. The bit which performs Ack request and the remaining repetition bits are used as described above.

Figure 24:
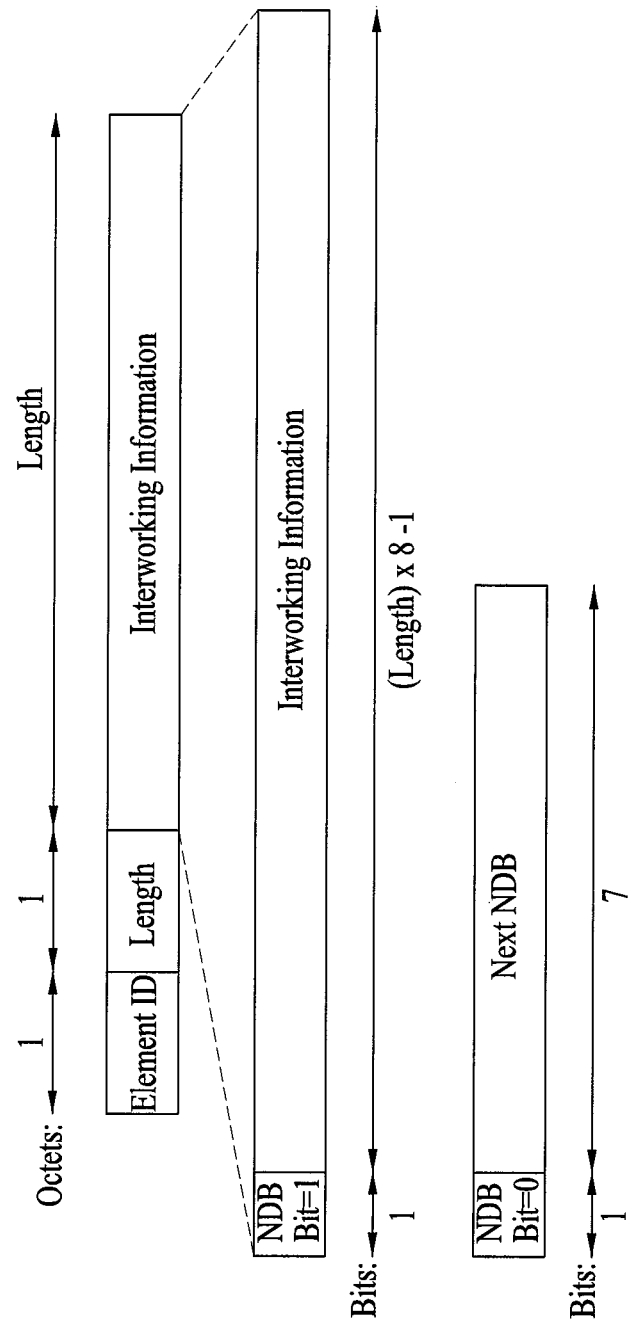
FIG. 24 illustrates another example of NDB information element (IE)

FIG. 24 illustrates another example of the NDB information element (IE). Referring to FIG. 24, the information element includes NDB bit. If the NDB bit is not set (i.e., NDB bit=0), 7 bits after the NDB bit indicate a beacon interval for indicating a transmission timing point of the next NDB. In FIG. 24, since the NDB bit is additionally provided, the next NDB list can be omitted if the interworking information is additionally included after the NDB information list. Since there is no limitation in the position of the NDB bit, the NDB bit may be located in various lists of a specific message.

FIGS. 25 to 28 illustrate examples of improving the interworking information IE by additionally providing two additional control bits.

Figure 25:
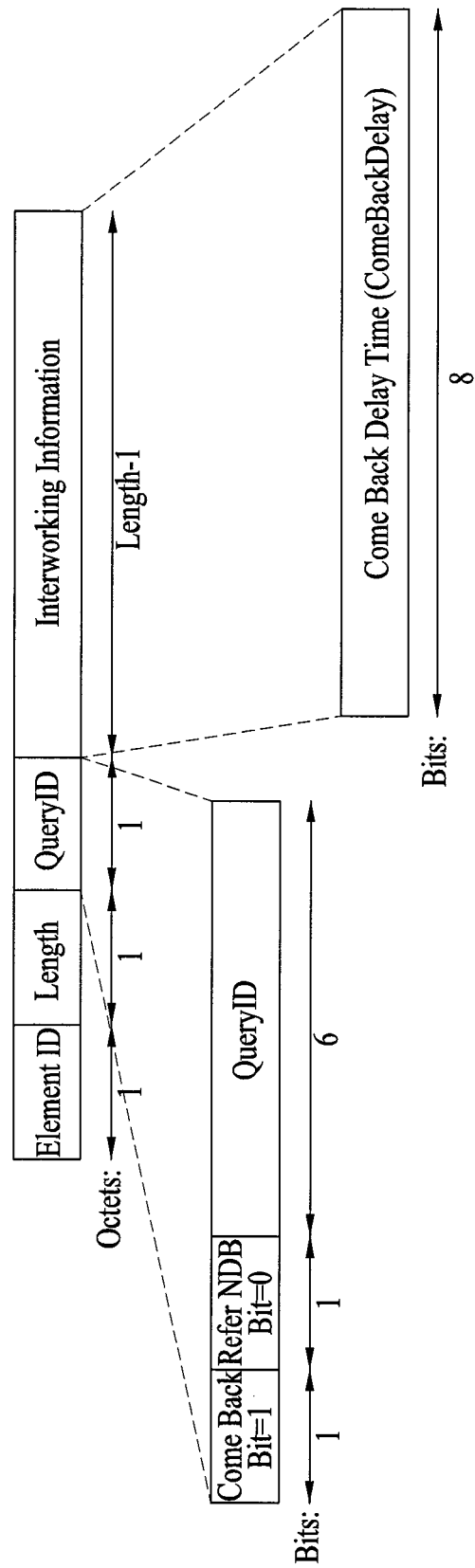
FIGS. 25 to 28 illustrate examples of improving interworking information IE by additionally providing two additional control bits.
Figure 26:
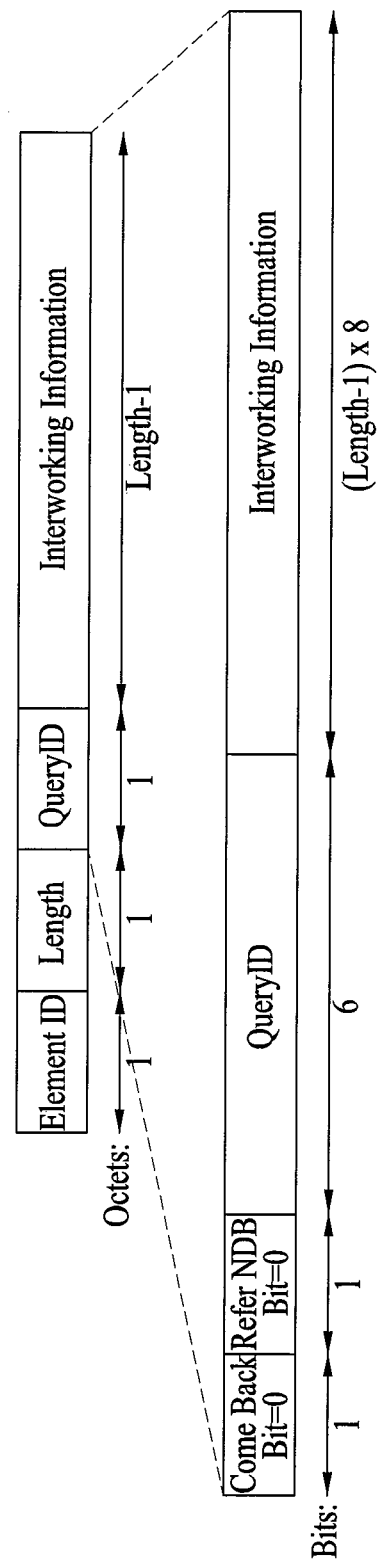

FIG. 25 illustrates an example of the interworking information. Two bits of an area which indicates Query ID are respectively used as ComeBack bit (first control bit) and refer NDB bit (second control bit). If the ComeBack bit is set (i.e., the first control bit=1), the interworking information includes Come Back Delay Time parameter which indicates time information as to when the ComeBack bit comes back after the QueryID to allow the requested information to be available. In other words, information of a retransmission timing point, which indicates when the interworking information requested from the user equipment is retransmitted, is included after the Query ID. If the ComeBack bit is not set (i.e., the first control bit=0), the interworking information does not include the Come Back Delay Time parameter. FIG. 25 illustrates the example where the ComeBack bit is set while FIG. 26 illustrates the example where the ComeBack bit is not set.

The ComeBack bit may not be set in case of the following two cases.

The first case corresponds to the case where Come Back Delay Time reported from the AP of the wireless LAN network passes and the AP transmits the interworking information requested from the user equipment by acquiring the interworking information from the interworking network.

The second case corresponds to the case where interworking information is prepared at the current time when the user equipment requests and is transmitted through the probe response message.

In the first case, since the AP is not provided with specific interworking information at the time when the user equipment requests the specific interworking information, the Query ID should be included in the probe response message. However, in the second case, since the AP is provided with the interworking information, the Query ID may be regarded as a waste of the radio resource.

Figure 27:
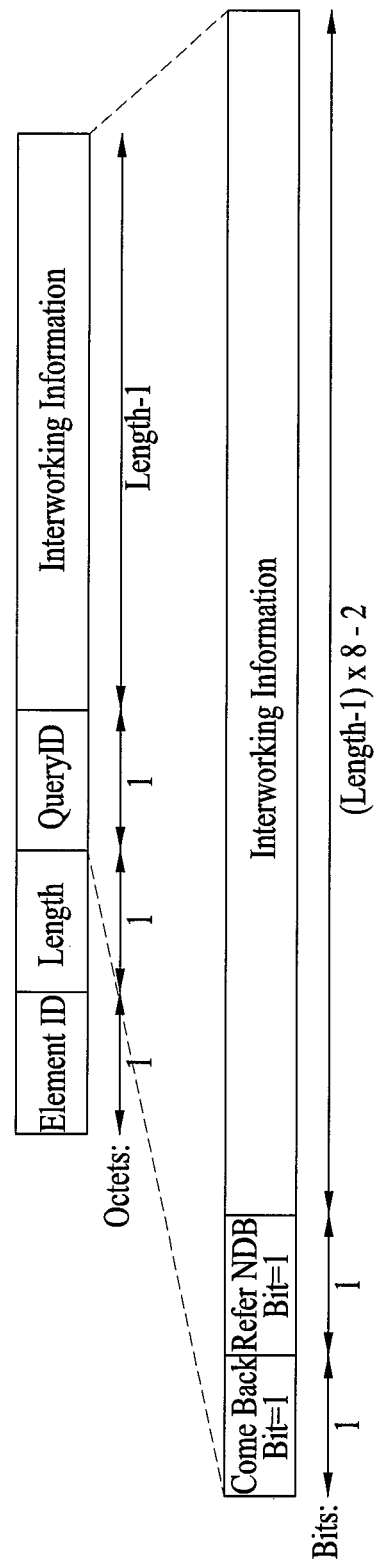
Figure 28:
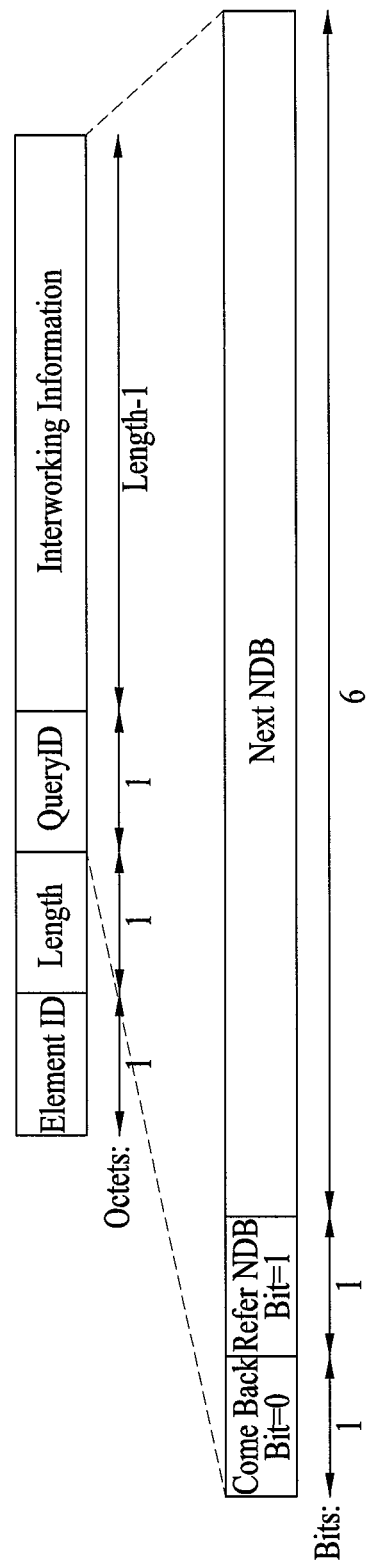

The waste of the radio resource is solved by the example of FIG. 27. In other words, if both the ComeBack bit and the refer NDB bit are set, the probe response message does not include the Query ID but includes the interworking information requested from the user equipment.

If the Come Back bit is not set but the refer NDB bit is set, the probe response message does not include the interworking information. However, the Next NDB is transmitted to report the transmission timing point of the next NDB. In other words, in FIG. 28, 6 bits after the refer NDB bit include period information, which indicates when the next NDB is transmitted, i.e., the Next NDB.

Figure 29:
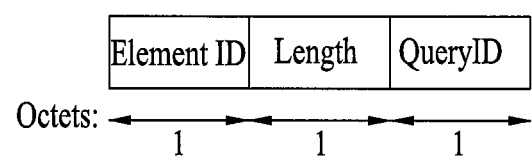
FIG. 29 illustrates an example of information element that a wireless LAN user equipment which has requested interworking information cancels the information request before an AP acquires the interworking information.

FIG. 29 illustrates an example of information element that the wireless LAN user equipment which has requested interworking information cancels the information request before the AP acquires information of the information request. Since Query ID allocated from the AP exists with respect to the information request of the user equipment, the information element for cancellation includes the Query ID. The AP can identify request for cancellation through the Query ID.

Figure 30:
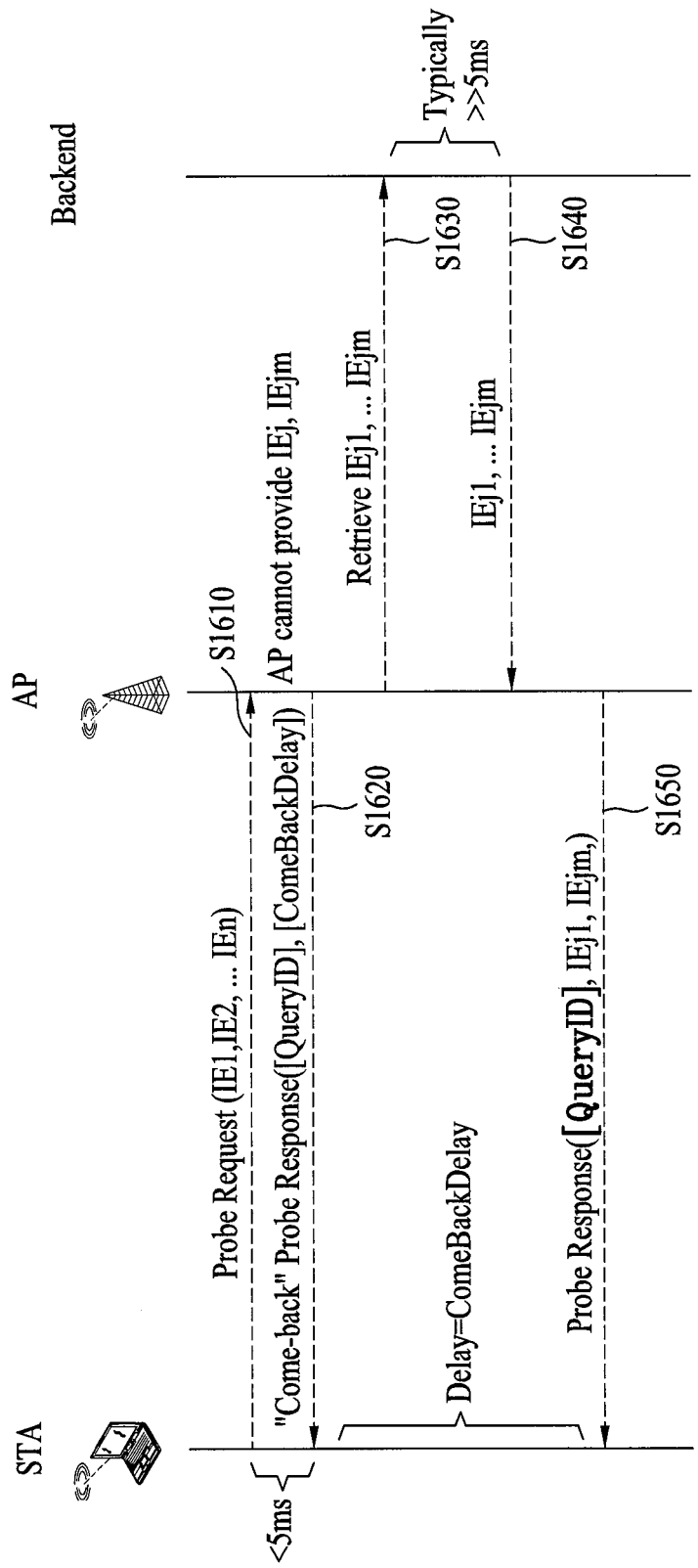
FIG. 30 is a flow chart of a procedure according to the preferred embodiment of the present invention.

FIG. 30 is a flow chart of a procedure according to the preferred embodiment of the present invention. Referring to FIG. 30, the AP requests and acquires interworking information at the request of the user equipment. In this case, the AP transmits the probe response message (unsolicited probe response message) even if the user equipment does not request the AP of the probe request message.

Hereinafter, an example of transmitting the probe request message to request the interworking information will be described. The probe request message is an example of a request message suggested in this embodiment of the present invention. The request message may be designated as various titles. Also, the action performed by the probe request message may be performed by the action frame of another title. Also, the action performed by the probe request message may be performed by various transmitting and receiving messages (for example, beacon message).

Hereinafter, the example of FIG. 30 will be described. The user equipment transmits the probe request message to the AP to request the interworking information (S1610). If the AP is not provided with the interworking information requested from the user equipment, a scheduled time ComeBackDelay required to obtain the interworking information and Query ID which is an identifier for identifying request of the user equipment are included in the probe response message which is transmitted (S1620). The AP performs the procedure of acquiring the interworking information requested from the user equipment. In other words, the AP acquires the interworking information requested from the user equipment by performing communication with the network entity having the interworking information (S1630, S1640). After the user equipment stands by for the ComeBackDelay time instructed from the AP, the user equipment receives the unsolicited probe response message, i.e., the probe response message transmitted from the AP. In this case, since Query ID included in the probe response message can be identified, the user equipment can identify that the information requested through the step S1610 has been transmitted (S1650).

Figure 31:
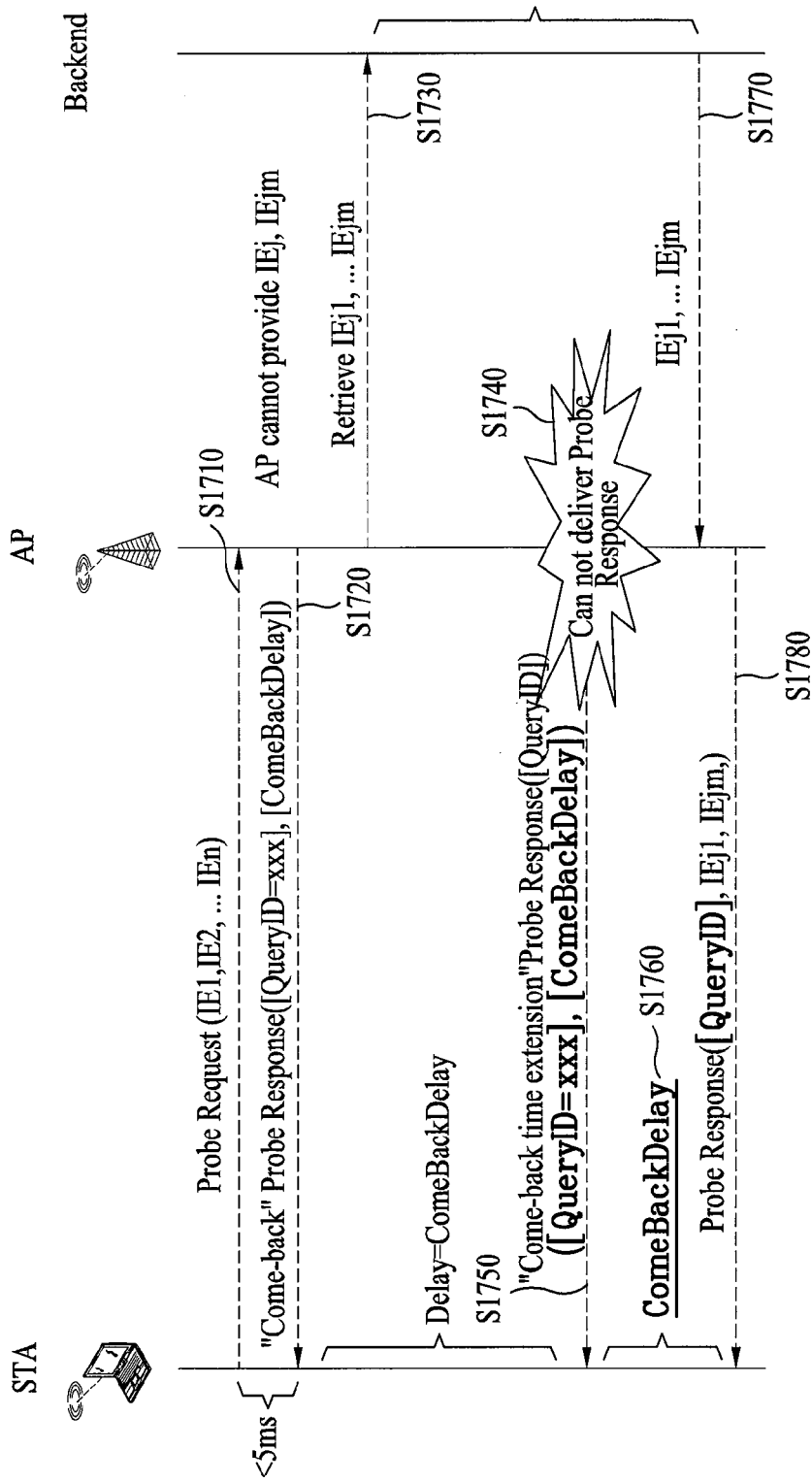
FIG. 31 is a flow chart illustrating the operation when the AP does not acquire the information requested from the wireless LAN user equipment even after the lapse of ComeBack-Delay time.

FIG. 31 is a flow chart illustrating the operation when the AP does not acquire the information requested from the user equipment even after the lapse of the ComeBackDelay time.

The user equipment transmits the probe request message to the AP to request the interworking information (S1710). If the AP is not provided with the interworking information requested from the user equipment, the AP transmits the probe response message to the user equipment, wherein the probe response message includes the scheduled time ComeBackDelay required to obtain the interworking information and the Query Id which is an identifier identifying request of the user equipment (S1720). The AP performs the procedure of acquiring the interworking information requested from the user equipment but does not complete acquisition of the interworking information (S1730, S1740). In other words, the AP does not acquire the interworking information until the ComeBackDelay time reported to the user equipment (S1740).

To report that the AP has not acquired the information for the ComeBackDelay time, the AP transmits the probe response message to the user equipment, wherein the probe response message includes Query ID equal to Query ID allocated through the step S1720 and new ComeBackDelay (S1750). The user equipment which has received the probe response message waits for the new ComeBackDelay time (S1760). The AP acquires the required interworking information for the new ComeBackDelay time (S1770). The AP transmits the acquired information to the user equipment for the time reported to the user equipment through the step S1750 (S1780).

Figure 32:
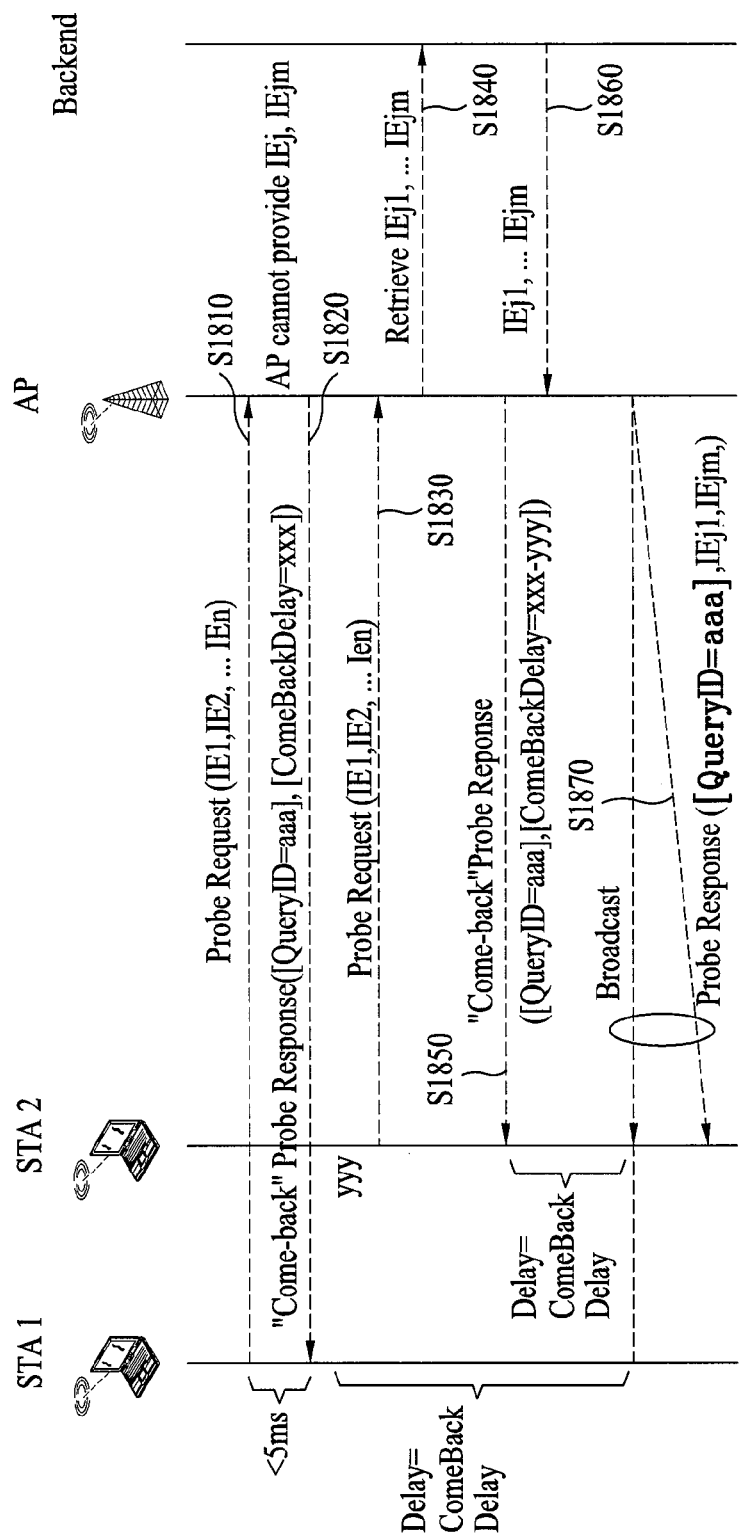
FIG. 32 illustrates an example that two or more user equipments request the interworking information.

FIG. 32 illustrates an example that two or more user equipments request the interworking information. Referring to FIG. 32, after the AP receives interworking information requested from the first user equipment, the AP receives another information request from the second user equipment before acquiring the interworking information, which is requested from the first user equipment, from the network. In this case, the AP can acquire both the information, which is requested from the first user equipment, and the information, which is requested from the second user equipment, from the network, and can broadcast the information.

It has been described in the example of FIG. 32 that the AP receives the second information request before starting the procedure of acquiring the first information after receiving the first information request. The example of FIG. 32 may be applied to the case where the AP receives the information request from the second user equipment during acquisition of the information requested from the first user equipment after receiving the first information request from the first user equipment. In other words, there is no limitation in the order of S1830 and S1840.

First, the first user equipment (STA1) requests the AP to provide the interworking information (S1810). If the AP does not have the information requested from the first user equipment, the AP transmits the probe response message to the first user equipment, wherein the probe response message includes the scheduled time ComeBackDelay required to acquire the interworking information and the Query ID which is an identifier identifying request of the user equipment (S1820). The second user equipment (STA2) requests information before the AP starts to acquire the information. At this time, the information requested from the second user equipment may be equal to or different from the information requested from the first user equipment, or may be partially equal to or partially different from the information requested from the first user equipment (S1830). The AP starts the procedure of acquiring the information requested from the first user equipment and the information requested from the second user equipment (S1840). The AP gives Query ID, which is equal to that given to the first user equipment, to the second user equipment to broadcast the acquired information (S1850). The AP acquires the information, which is requested from the first user equipment, and the information, which is requested from the second user equipment, from the network (S1860). The AP broadcasts the information including the same Query ID allocated to the two user equipments to transmit the acquired information to the first user equipment and the second user equipment (S1870).

Referring to FIG. 32, the AP can transmit information acquired from backend as shown to a plurality of user equipments. The example of FIG. 32 relates to a method of transmitting information to a plurality of user equipments. Various methods can be used to transmit information to a plurality of user equipments. Examples of the various methods include a broadcast method and a multicast method. Accordingly, the example of FIG. 32 is not limited to the broadcast method.

Figure 33:
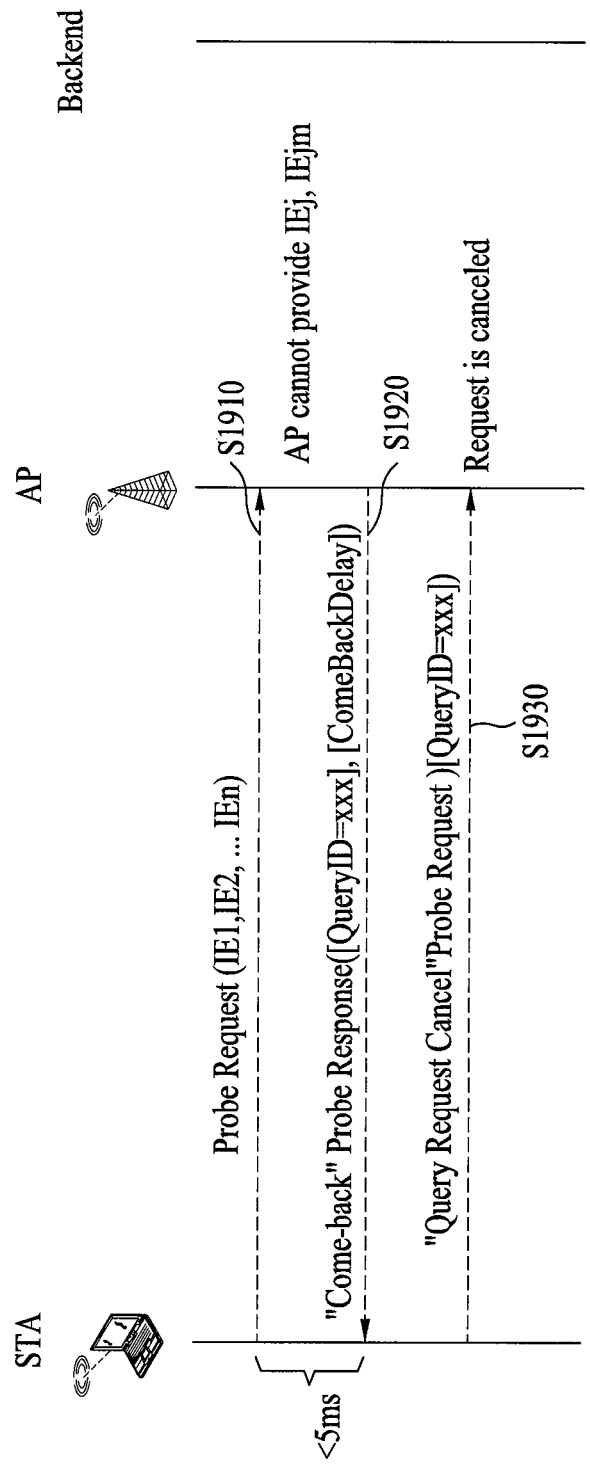
FIG. 33 illustrates an example that the wireless LAN user equipment cancels acquisition of requested information.

FIG. 33 illustrates an example that the wireless LAN user equipment cancels the request of information acquisition.

The user equipment transmits the probe request message to the AP to request interworking information (S1910). If the AP does not have the information requested from the user equipment, the AP transmits the probe response message to the user equipment, wherein the probe response message includes the scheduled time ComeBackDelay required to acquire the interworking information and Query ID which is an identifier identifying request of the user equipment (S1920). The user equipment which has received the probe response message can cancel the information request if it cannot wait for the scheduled time or it acquires the interworking information from another AP or determines to access another AP. The user equipment cancels the information request by transmitting the probe request message to the AP, wherein the probe request message includes Query Request Cancel IE which includes Query ID allocated during information request of S1910 (S1930).

Figure 34:
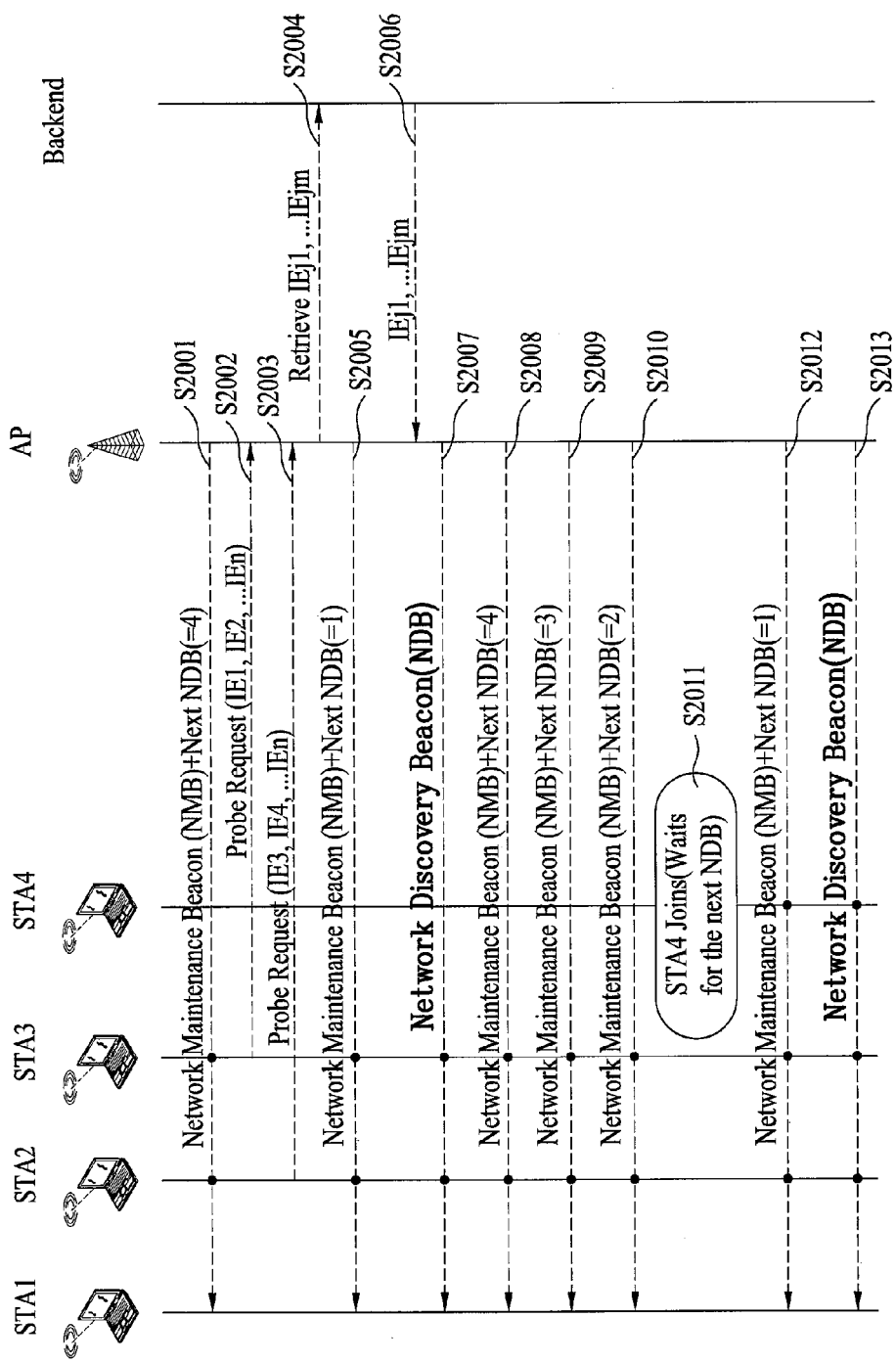
FIG. 34 is a flow chart illustrating a method for reporting a transmission timing point of NDB to a wireless LAN user equipment as an AP forwards a period of NDB per NMB.

FIG. 34 is a flow chart illustrating a method for reporting an exact transmission timing point of separate network entity related information transmitted to the user equipment, wherein the separate network entity communicates with the AP.

The separate network entity could be either the interworking information broker or a server which includes a function of the interworking information broker.

The separate network entity related information has various kinds. For example, the separate network entity related information could be the NDB or response information which the AP has acquired from the separate network entity.

The example of FIG. 34 relates to NDB among the separate network entity related information, and the separate network entity is a backend server.

As described above, network maintenance beacon (NMB), which is a conventional beacon message, is a signal transmitted from the AP to report the presence of the AP, and includes information of the AP. The NDB is a beacon message which includes the interworking information. The beacon may be transmitted periodically, and a transmission interval of the beacon may be controlled to vary a transmission period.

In the example of FIG. 34, a transmission period of the next NDB is forwarded to the NMB so that the user equipment identifies when the NDB is transmitted.

Since the user equipment knows when the NDB is transmitted, it does not transmit unnecessary probe request (S2001).

The Second User Equipment Requests the AP to Provide information (probe request) if it cannot wait until the transmission period of the next NDB or if there is no desired information in the received NDB (S2002).

The third user equipment also requests the AP to provide information (probe request) at a similar timing point. The information requested from the third user equipment may be equal to or different from the information requested from the second user equipment, or may be partially equal to or partially different from the information requested from the second user equipment (S2003).

The AP starts the procedure of acquiring the information, which is requested from the second user equipment, and the information, which is requested from the third user equipment, from the network (S2004). The AP indicates the transmission period of the NDB in the next NDB along with the information requested from the second user equipment and the third user equipment at the scheduled time for acquisition of the information requested from the second user equipment and the third user equipment.

In the example of FIG. 34, the AP can acquire the information at the transmission period of the next beacon and sets Next NDB to 1 to transmit the information (S2005). The AP acquires the information, which is requested from the second user equipment and the third user equipment, from the backend network interworking with the wireless network (S2006). The information acquired through the step S2006 is transmitted at the transmission period of S2005 (S2007). The AP reduces the transmission period of the NDB whenever the beacon is transmitted (S2008 to S2010). In other words, in case of S2008, since the NDB is transmitted at the fourth period, Next NDB is set to 4. In case of S2009, since the NDB is transmitted at the third period, Next NDB is set to 3. In case of S2010, since the NDB is transmitted at the second period, Next NDB is set to 2. In case of S2011, since the NDB is transmitted at the first period, Next NDB is set to 1.

A new fourth user equipment (STA 4) can start communication with the AP during transmission of the beacon. The fourth user equipment also waits for reception of the NDB. The fourth user equipment performs auto scanning to newly access the wireless LAN network (S2011). In addition to the first to third user equipments, the fourth user equipment also receives the beacon (network maintenance beacon), wherein the NMB includes the transmission period of the next NDB (S2012). The above user equipments wait for the transmission period of the next NDB to receive the interworking information (S2013).

The aforementioned Next NDB field may be designated as various terms. The Next NDB field should preferably report the transmission timing point to the user equipment by reducing the size of a value or an identifier of a specific field.

Figure 35:
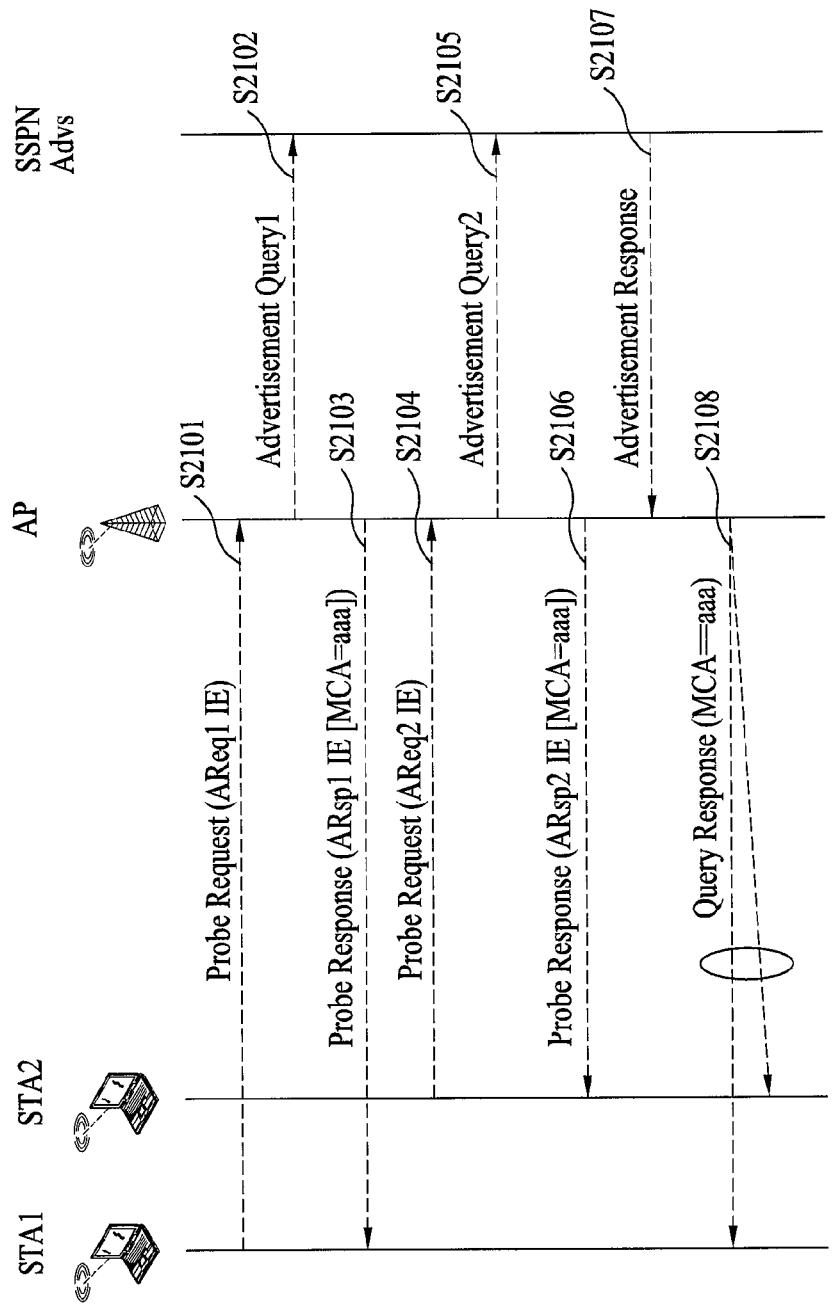
FIG. 35 is a flow chart illustrating a procedure of transmitting and receiving data in accordance with the preferred embodiment of the present invention.

FIG. 35 is a flow chart illustrating a procedure of transmitting and receiving data in accordance with the preferred embodiment of the present invention.

In FIG. 35, after the AP receives information request A from the first user equipment STA 1, if the AP receives information request B from the second user equipment STA 2 before acquiring corresponding information from the network, the AP fails to provide the corresponding information immediately.

At this time, the AP can acquire the information A and the information B, which are requested from the two user equipments, from the network and multicast the acquired information. Also, the AP may acquire information, which is requested from one user equipment, from the network and multicast the acquired information.

A corresponding group is divided for multicast address and divides user equipments which request interworking information for a specific time into one group. In this embodiment of the present invention, the AP receives the second information request before starting the procedure of acquiring the first information after receiving the first information request. Also, this embodiment of the present invention corresponds to the case that the AP receives the same information request.

The first user equipment STA 1 requests the AP to provide information (S2101). If the AP does not have the information requested from the first user equipment, the AP sends information query to SSPN Advs (S2102). The AP reports to the user equipment that a response to the query will be broadcasted using multicast address. If the AP can immediately provide the requested information, the AP can transmit ARsp1 IE to the user equipment, wherein the ARsp1 IE includes the corresponding information (S2103). The second user equipment STA 2 requests information before the AP starts to acquire the information. At this time, the information requested from the second user equipment may be equal to or different from the information requested from the first user equipment, or may be partially equal to or partially different from the information requested from the first user equipment (S2104). Also, the AP starts the procedure of acquiring the information requested from the second user equipment (S2105). The AP allocates the same multicast address for information requested within a specific time (A time) so that the same multicast address as that of the first user equipment is allocated to the second user equipment. In the same manner as the first user equipment, if the AP can immediately provide the information requested from the second user equipment, the AP can transmit ARsp2 IE to the user equipment, wherein the ARsp2 IE includes the corresponding information (S2106). The AP acquires the information requested from the first user equipment and the second user equipment from the network (S2107). The AP broadcasts the information using the same multicast address allocated to the two user equipments to forward the acquired information to both the first user equipment and the second user equipment (S2108). If the information requested from the first user equipment is different from the information requested from the second user equipment, the AP may transmit the information including information which is not requested.

As shown, the action transmitted from the AP to the user equipment can be repeated several times. There is no limitation in the action repeated several times.

Figure 36:
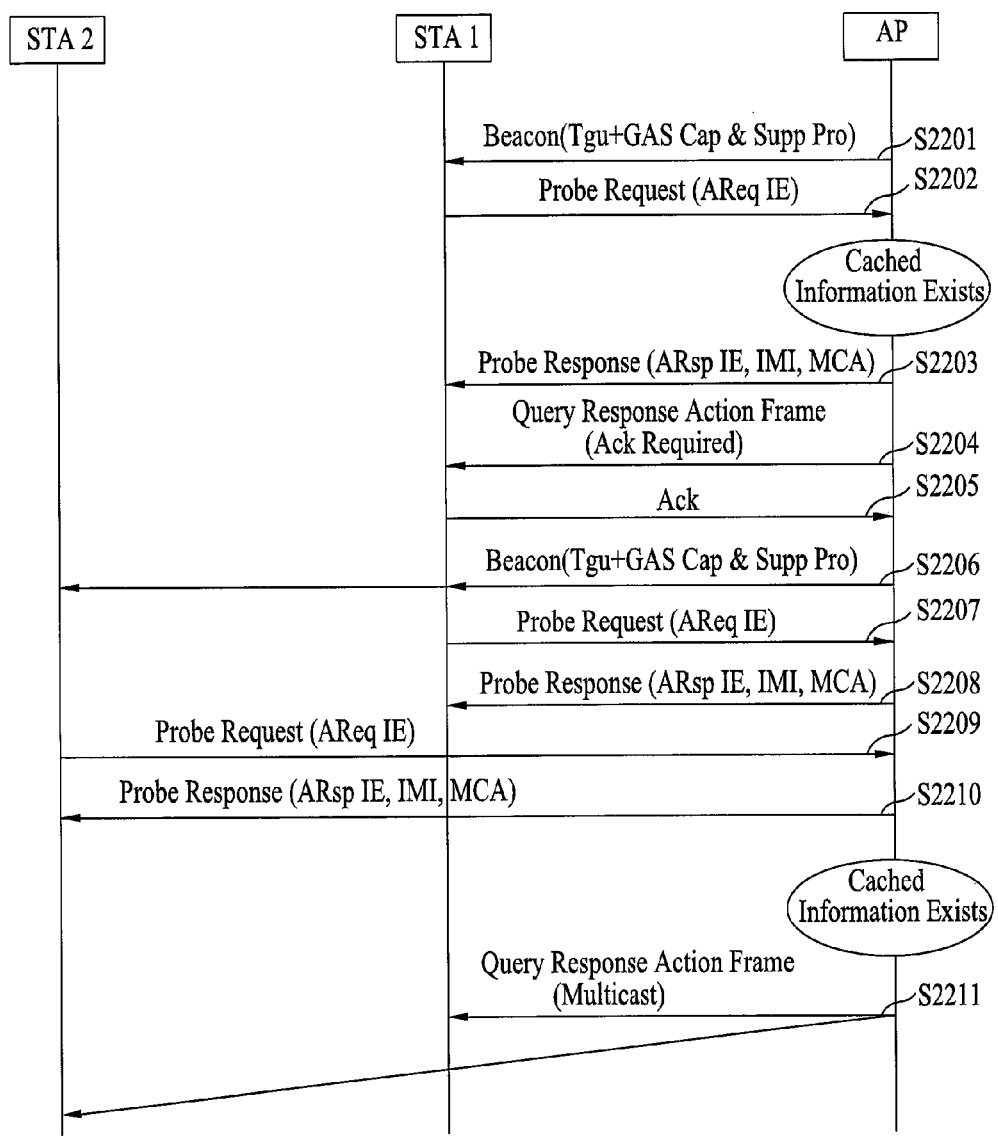
FIGS. 36 to 37 are another examples of flow charts illustrating a procedure of transmitting and receiving data in accordance with the preferred embodiment of the present invention.

FIG. 36 is another example of a flow chart illustrating a procedure of transmitting and receiving data in accordance with the preferred embodiment of the present invention.

Referring to FIG. 36, if the AP temporarily caches the information requested from the user equipment or if the AP can acquire the requested information for a short time, the AP transmits the information to one user equipment or a plurality of user equipments, which request the information.

Hereinafter, the case where one user equipment requests information will be described. If one user equipment requests the information, the operation can be performed in accordance with the steps S2201 to S2205.

The AP reports to the user equipment through the beacon whether general advertisement service (GAS) and TGu service are available (S2201). The user equipment which identifies that the AP can interwork with the external network transmits AReq IE which includes network interworking information (S2202).

If the AP caches the information requested from the user equipment or can provide the information immediately through some action, the AP sets 'Successful and immediate information delivery' which is a status code indicating an immediate message indicator (IMI) and transmits the probe response along with multicast address (MCA) (S2203). At this time, 'Query Response Waiting Time' which is a waiting time which the user equipment should wait for interworking information may be also set and then transmitted. If this 'Query Response Waiting Time' value is not transmitted, a value defined as default is used. If the requested information is not transmitted for the waiting time, step S2202 is performed again. The AP transmits the action frame which includes the information requested from the user equipment. At this time, if the action frame is for one user equipment, 'Ack required bit' is set to identify whether the specific user equipment has successfully received the action frame (S2204, S2205).

Hereinafter, the case where a plurality of user equipments request the information will be described. If the plurality of user equipments request the information, the operation can be performed in accordance with the steps S2206 to S2210.

The AP reports to the first user equipment STA 1 and the second user equipment STA 2 through the beacon whether general advertisement service (GAS) and TGu service are available (S2206). The first user equipment STA 1 which identifies that the AP can interwork with the external network transmits AReq IE which includes network interworking information (S2206). If the AP caches the information requested from the first user equipment or can provide the information immediately through some action, the AP sets 'Successful and immediate information delivery' which is a status code indicating an immediate message indicator (IMI) and transmits the probe response along with multicast address (MCA) (S2208). The steps S2209 to S2210 are performed by the second user equipment and are equal to the steps S2207 and S2208. Since two ore more user equipments request the information for a set time, the AP multicasts the action frame to the first and second user equipments and releases 'Ack required bit' so as not to transmit 'Ack' (S2211). In this case, the action frame may be transmitted repeatedly using remaining repetition parameters to improve reliability of information transmission.

Figure 37:
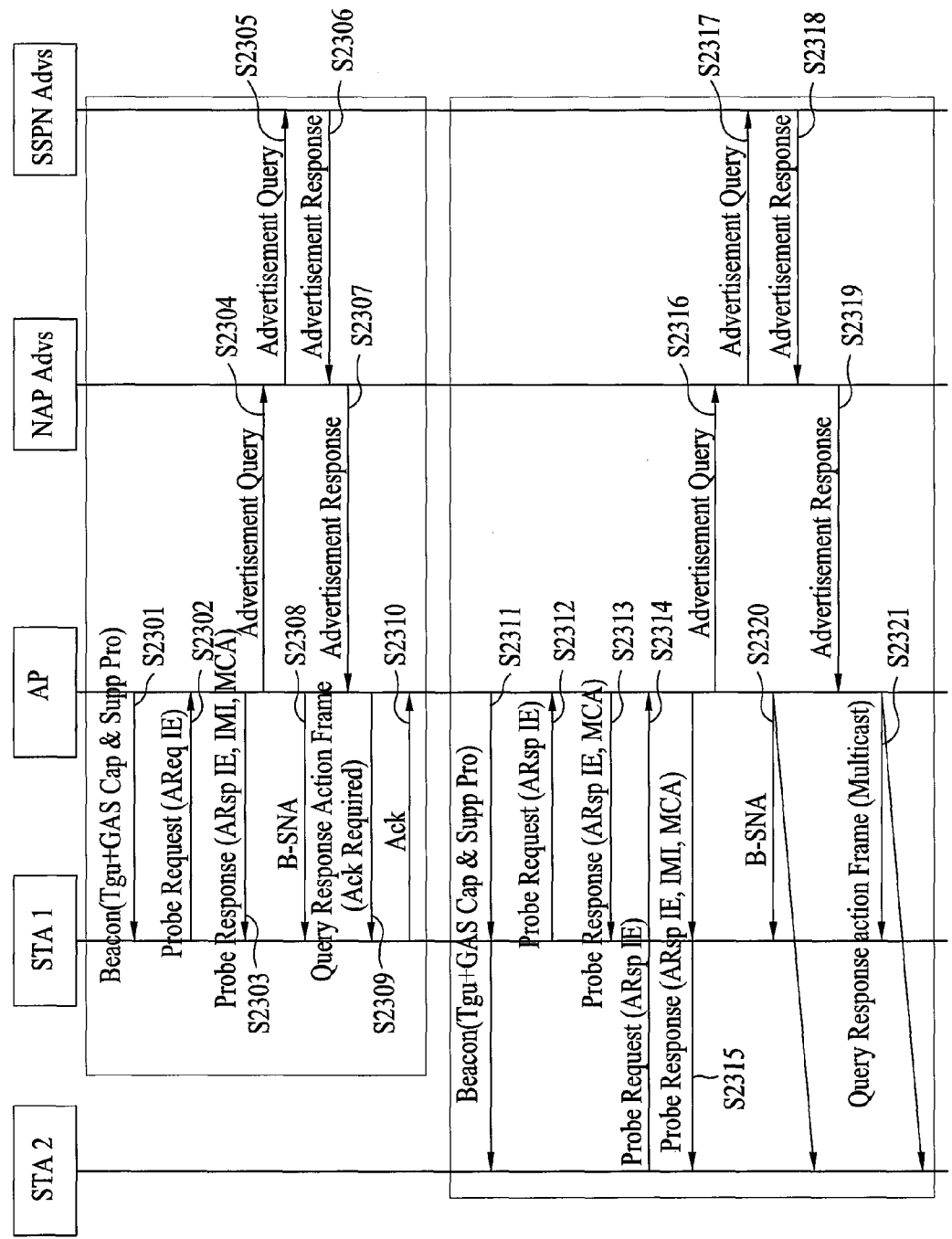

FIG. 37 illustrates another example of a flow chart illustrating a procedure of transmitting and receiving data in accordance with the preferred embodiment of the present invention.

Referring to FIG. 37, if the AP acquires network interworking information, which is requested from the user equipment, to SSPN Advs server through query, the AP transmits the information to one user equipment or a plurality of user equipments, which request the information.

Hereinafter, the case where one user equipment requests information will be described. If one user equipment requests the information, data transmission and reception is performed in accordance with the steps S2301 to S2310.

The AP reports to the user equipment through the beacon whether general advertisement service (GAS) and TGu service are available (S2301). The user equipment which identifies that the AP can interwork with the external network transmits AReq IE which includes network interworking information (S2302). The AP transmits a status code 'Successful and information delivery using B-SNA beacon indication' and multicast address (MCA) to the user equipment through the probe response, wherein the status code indicates that information will be delivered depending on a period of B-SNA beacon with respect to request of network interworking information. At this time, the user equipment knows that the requested information will be acquired to the delivered MCA (S2303). The AP starts the procedure of acquiring the information requested from the user equipment and acquires the information (S2304 to S2307). The AP delivers the B-SNA beacon to the user equipment to intend that multicast message will be delivered immediately after B-SNA is transmitted (S2308). The AP transmits the action frame which includes the information requested from the user equipment. At this time, if the action frame is for one user equipment, the AP sets 'Ack required bit' and transmits the 'Ack required bit' to the user equipment so that the user equipment transmits 'ack' if it receives the action frame rightly (S2309). The user equipment which has received the action frame rightly transmits 'ack' to the AP (S2310).

Hereinafter, the case where a plurality of user equipments request the information will be described. If the plurality of user equipments request the information, data transmission and reception is performed in accordance with the steps S2311 to S2321.

The AP reports to the first user equipment STA 1 and the second user equipment STA 2 through the beacon whether general advertisement service (GAS) and TGu service are available (S2311). The first user equipment STA 1 which identifies that the AP can interwork with the external network transmits AReq IE which includes network interworking information (S2312). The AP transmits a status code 'Successful and information delivery using B-SNA beacon indication' and multicast address (MCA) to the first user equipment through the probe response, wherein the status code indicates that information will be delivered depending on a period of B-SNA beacon with respect to request of network interworking information. At this time, the first user equipment knows that the requested information will be acquired to the delivered MCA (S2313). The steps S2314 to S2315 are performed by the second user equipment and are equal to the steps S2312 and S2313. The AP starts the procedure of acquiring the information requested from the user equipments and acquires the information. This procedure is performed before the B-SNA beacon and the query response action frame are transmitted (S2316 to S2319). The AP delivers the B-SNA beacon to the first user equipment and the second user equipment to intend that multicast message will be delivered immediately after the B-SNA is transmitted (S2320). The AP transmits the action frame which includes the information requested from the user equipment. At this time, if the action frame is for two or more user equipments, the AP releases 'Ack required bit' and transmits the 'Ack required bit' to the user equipments so that the user equipments do not transmit 'ack' after they receive the action frame (S2321). The steps S2320 and S2321 can repeatedly be performed several times to improve reliability, wherein repetition information is transmitted to the user equipments through remaining repetition parameters.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to various communication systems having an idle mode.

Since the interworking information broker serves to acquire and transmit the interworking information within the DS, throughput processed by each AP can be reduced.

Furthermore, the AP can report to the wireless LAN user equipment through the network maintenance beacon (NMB) when NDB is transmitted, wherein the NDB is required for the user equipment to acquire the interworking information from the AP.

Moreover, the radio resources can be used efficiently in accordance with the present invention.

What is claimed is:
1. A method for processing interworking information in a wireless local area network (LAN), the method performed by a responding station and comprising:
transmitting, to a requesting station, a beacon message including capability information on a generic advertisement service (GAS) that is associated with an interworking information broker;
receiving, from the requesting station, an initial request message for requesting the responding station to acquire a query response from the interworking information broker;
transmitting, to the interworking information broker, a query request to acquire the query response;
determining whether the query response is received from the interworking information broker in response to the query request;
when the query response is received, determining whether the query response is able to be completely transmitted to the requesting station and whether to perform fragmentation to the query response based on a length of the query response;
when the query response is unable to be completely transmitted to the requesting station and when the fragmentation is performed, transmitting, to the requesting station, an initial response to enable the responding station to delay during a comeback delay time which is indicated by the initial response,
wherein the initial response includes a category field followed by an action field followed by at least one query response element,
wherein the category field indicates a category of the initial response, and
wherein the action field indicates an action value of the initial response;
after the comeback delay time, receiving, from the requesting station, a comeback request requesting transmission of the query response;
in response to the comeback request, transmitting, to the requesting station, a comeback response including a fragment of the query response and a fragmentation identifier (ID), wherein a value of the fragmentation ID increases as the comeback response is transmitted; and
repeatedly transmitting, to the requesting station, the comeback response until a final fragment is transmitted to the requesting station.

2. The method of claim 1, wherein the beacon message is transmitted by a medium access control (MAC) layer of the responding station.

3. The method of claim 1, wherein the initial request message includes a MAC address of the requesting station.

4. A responding station in a wireless local area network (LAN) network, the responding station comprising:
a processor configured for:
transmitting, to a requesting station, a beacon message including capability information on a generic advertisement service (GAS) that is associated with an interworking information broker;
receiving, from the requesting station, an initial request message for requesting the responding station to acquire a query response from the interworking information broker;
transmitting, to the interworking information broker, a query request to acquire the query response;
determining whether the query response is received from the interworking information broker in response to the query request;
when the query response is received, determining whether the query response is able to be completely transmitted to the requesting station and determining whether to perform fragmentation to the query response based on a length of the query response;
when the query response is unable to be completely transmitted to the requesting station and when the fragmentation is performed, transmitting, to the requesting station, an initial response to enable the responding station to delay during a comeback delay time which is indicated by the initial response,
wherein the initial response includes a category field followed by an action field followed by at least one query response element,
wherein the category field indicates a category of the initial response, and
wherein the action field indicates an action value of the initial response;
after the comeback delay time, receiving, from the requesting station, a comeback request requesting transmission of the query response;
in response to the comeback request, transmitting, to the requesting station, a comeback response including a fragment of the query response and a fragmentation identifier (ID), wherein a value of the fragmentation ID increases as the comeback response is transmitted; and
repeatedly transmitting, to the requesting station, the comeback response until a final fragment is transmitted to the requesting station.

5. The responding station of claim 4, wherein the beacon message is transmitted by a medium access control (MAC) layer of the responding station.

6. The responding station of claim 4, wherein the initial request message includes a MAC address of the requesting station.

* * * * *